(12) United States Patent
Sikora et al.

(10) Patent No.: US 11,834,174 B2
(45) Date of Patent: *Dec. 5, 2023

(54) CONTROL OF DRONE-LOAD SYSTEM METHOD, SYSTEM, AND APPARATUS

(71) Applicant: Vita Inclinata IP Holdings LLC, Broomfield, CO (US)

(72) Inventors: Derek Sikora, Denver, CO (US); Logan Goodrich, Golden, CO (US); Caleb B Carr, Commerce City, CO (US)

(73) Assignee: Vita Inclinata IP Holdings LLC, Broomfield, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/135,070

(22) Filed: Apr. 14, 2023

(65) Prior Publication Data
US 2023/0249820 A1 Aug. 10, 2023

Related U.S. Application Data

(63) Continuation of application No. 17/875,873, filed on Jul. 28, 2022, which is a continuation of application
(Continued)

(51) Int. Cl.
| | | |
|---|---|---|
| *B64C 39/02* | (2023.01) | |
| *B64D 1/08* | (2006.01) | |
| *B64D 9/00* | (2006.01) | |
| *B64D 1/22* | (2006.01) | |
| *B64U 10/13* | (2023.01) | |
| *B64U 101/60* | (2023.01) | |

(52) U.S. Cl.
CPC .............. *B64C 39/024* (2013.01); *B64D 1/08* (2013.01); *B64D 1/22* (2013.01); *B64D 9/00* (2013.01); *B64U 10/13* (2023.01); *B64U 2101/60* (2023.01)

(58) Field of Classification Search
CPC .......... B64C 39/024; B64D 1/08; B64D 1/22; B64D 9/00; B64U 10/13; B64U 2101/60
See application file for complete search history.

(56) References Cited

U.S. PATENT DOCUMENTS

| 1,935,283 A | 11/1933 | Adams |
| 2,264,936 A | 12/1941 | Dorsa |
| (Continued) | | |

FOREIGN PATENT DOCUMENTS

| EP | 0606108 A1 | 7/1994 |
| GB | 2327657 A | 2/1999 |
| (Continued) | | |

OTHER PUBLICATIONS

All pages, Written Opinion dated Apr. 30, 2020 for PCT Application No. PCT/US2020/017790, filed Feb. 11, 2020.
(Continued)

*Primary Examiner* — Peter D Nolan
*Assistant Examiner* — Demetra R Smith-Stewart
(74) *Attorney, Agent, or Firm* — Martin Spencer Garthwaite

(57) ABSTRACT

Disclosed are systems, apparatuses, and methods to enhance control of a drone-load system, including through drone thrusters or load thrusters.

21 Claims, 17 Drawing Sheets

Related U.S. Application Data

No. PCT/US2021/015561, filed on Jan. 28, 2021, and a continuation of application No. 17/161,388, filed on Jan. 28, 2021, now Pat. No. 11,142,316, which is a continuation-in-part of application No. 16/988,373, filed on Aug. 7, 2020, which is a continuation-in-part of application No. PCT/US2019/013603, filed on Jan. 15, 2019, said application No. 16/988,373 is a continuation of application No. PCT/US2019/013603, filed on Jan. 15, 2019.

(60) Provisional application No. 62/966,851, filed on Jan. 28, 2020, provisional application No. 62/757,414, filed on Nov. 8, 2018, provisional application No. 62/627,920, filed on Feb. 8, 2018.

(56) References Cited

U.S. PATENT DOCUMENTS

| | | |
|---|---|---|
| 2,428,656 A | 10/1947 | Elliott et al. |
| 2,651,533 A | 9/1953 | Cecil |
| 2,717,656 A | 9/1955 | Bannister |
| 3,036,797 A | 5/1962 | Domenico |
| 3,044,818 A | 7/1962 | Harry |
| 3,210,115 A | 10/1965 | Irving et al. |
| 3,265,336 A | 8/1966 | Peterson |
| 3,498,476 A | 3/1970 | Mattson et al. |
| 3,554,468 A | 1/1971 | Mcvicar |
| 3,598,440 A | 8/1971 | Ramsden et al. |
| 3,601,342 A | 8/1971 | Piasecki |
| 3,602,544 A | 8/1971 | Marsh |
| 3,656,796 A | 4/1972 | Cook |
| 3,690,602 A | 9/1972 | Marsh |
| 3,724,817 A | 4/1973 | Simons |
| 3,829,052 A | 8/1974 | Flannelly |
| 3,833,189 A | 9/1974 | Fowler et al. |
| 3,838,836 A | 10/1974 | Asseo et al. |
| 3,904,156 A | 9/1975 | Smith |
| 3,946,971 A | 3/1976 | Chadwick |
| 4,124,181 A | 11/1978 | Kolwey |
| 4,138,078 A | 2/1979 | Hester et al. |
| 4,267,987 A | 5/1981 | McDonnell |
| 4,364,704 A | 12/1982 | Dreesen et al. |
| 4,378,919 A | 4/1983 | Smith |
| 4,553,719 A | 11/1985 | Ott |
| 4,601,444 A | 7/1986 | Lindenbaum |
| 4,695,012 A | 9/1987 | Lindenbaum |
| 4,747,745 A | 5/1988 | Pippen et al. |
| 4,826,109 A | 5/1989 | Camus |
| 4,881,601 A | 11/1989 | Smith |
| 4,883,184 A | 11/1989 | Albus |
| 4,889,297 A | 12/1989 | Ikeda |
| 4,984,757 A | 1/1991 | Hartung et al. |
| 5,071,184 A | 12/1991 | Dessaux |
| 5,071,573 A | 12/1991 | Coffindaffer et al. |
| 5,125,707 A | 6/1992 | Chaen et al. |
| 5,131,491 A | 7/1992 | Varner et al. |
| 5,143,326 A | 9/1992 | Parks |
| 5,190,250 A | 3/1993 | DeLong et al. |
| 5,249,652 A | 10/1993 | Leitzman et al. |
| 5,273,333 A | 12/1993 | Hatfield et al. |
| 5,299,845 A | 4/1994 | Gabriel |
| 5,344,203 A | 9/1994 | Tollenaere |
| 5,352,056 A | 10/1994 | Chandler |
| 5,358,219 A | 10/1994 | Shenk et al. |
| 5,443,566 A | 8/1995 | Rushmer et al. |
| 5,451,032 A | 9/1995 | Rhoads |
| 5,465,925 A | 11/1995 | Connolly et al. |
| 5,499,785 A | 3/1996 | Roberts et al. |
| 5,518,205 A | 5/1996 | Wurst et al. |
| 5,524,870 A | 6/1996 | Tallent et al. |
| 5,562,394 A | 10/1996 | Brown, Jr. |
| 5,593,113 A | 1/1997 | Cox |
| 5,613,722 A | 3/1997 | Fandrich et al. |
| 5,816,636 A | 10/1998 | Gibson et al. |
| 5,871,249 A | 2/1999 | Williams |
| 5,898,746 A | 4/1999 | Baversten et al. |
| 5,927,438 A | 7/1999 | Ostrobrod |
| 5,961,563 A | 10/1999 | Overton |
| 6,189,834 B1 | 2/2001 | Dietz et al. |
| 6,199,793 B1 | 3/2001 | Hainsworth et al. |
| 6,439,407 B1 | 8/2002 | Jacoff et al. |
| 6,533,220 B2 | 3/2003 | Schuster |
| 6,578,796 B2 | 6/2003 | Maeda |
| 6,708,926 B2 | 3/2004 | Bonisch |
| 6,814,185 B1 | 11/2004 | Ostrobrod |
| 6,983,833 B2 | 1/2006 | Ivers et al. |
| 7,028,351 B1 | 4/2006 | Frieder et al. |
| 7,131,515 B2 | 11/2006 | Gartsbeyn et al. |
| 7,267,240 B2 | 9/2007 | Maurer et al. |
| 7,720,582 B2 | 5/2010 | Makinadjian |
| 7,887,011 B1 | 2/2011 | Baldwin |
| 7,948,237 B2 | 5/2011 | Kuzmin et al. |
| 8,131,384 B2 | 3/2012 | Karpman et al. |
| 8,157,205 B2 | 4/2012 | McWhirk |
| 8,226,042 B1 | 7/2012 | Howell et al. |
| 8,231,083 B2 | 7/2012 | Kutzmann et al. |
| 8,292,229 B2 | 10/2012 | Pancotti et al. |
| 8,413,923 B2 | 4/2013 | Brenner et al. |
| 8,496,279 B2 | 7/2013 | Aoki |
| 8,534,607 B2 | 9/2013 | Tardiff et al. |
| 8,534,608 B1 | 9/2013 | Cox, IV |
| 8,591,161 B1 | 11/2013 | Bernhardt |
| 8,840,355 B1 | 9/2014 | Kulesha |
| 8,886,402 B1 | 11/2014 | Lou |
| 8,888,048 B2 | 11/2014 | Figoureux et al. |
| 8,894,050 B2 | 11/2014 | Wootten et al. |
| 8,899,903 B1 | 12/2014 | Saad et al. |
| 8,903,568 B1 | 12/2014 | Wang et al. |
| 8,925,901 B2 | 1/2015 | Gaillard |
| 8,938,325 B1 | 1/2015 | McGinnis et al. |
| 8,967,533 B2 | 3/2015 | DeVaul et al. |
| 9,027,976 B1 | 5/2015 | Tollenaere |
| 9,096,294 B1 | 8/2015 | Dong et al. |
| 9,114,871 B2 | 8/2015 | Woodworth et al. |
| 9,194,977 B1 | 11/2015 | Dungan et al. |
| 9,205,922 B1 | 12/2015 | Bouwer |
| 9,223,008 B1 | 12/2015 | Hartman et al. |
| 9,242,741 B1 | 1/2016 | Cockell |
| 9,302,770 B2 * | 4/2016 | Burgess .................. B64D 1/12 |
| 9,422,139 B1 | 8/2016 | Bialkowski et al. |
| 9,676,481 B1 | 6/2017 | Buchmueller |
| 9,688,404 B1 | 6/2017 | Buchmueller et al. |
| 9,800,091 B2 | 10/2017 | Nugent, Jr. et al. |
| 9,836,063 B1 | 12/2017 | Bonawitz et al. |
| 9,849,981 B1 * | 12/2017 | Burgess .................. B64D 1/12 |
| 9,850,113 B2 | 12/2017 | Melin et al. |
| 9,881,506 B1 | 1/2018 | Gentry |
| 9,908,756 B2 | 3/2018 | Heravi et al. |
| 9,958,876 B2 | 5/2018 | Lind et al. |
| 10,023,312 B2 | 7/2018 | Repp et al. |
| 10,023,313 B2 | 7/2018 | Behrens et al. |
| 10,071,804 B1 | 9/2018 | Buchmueller et al. |
| 10,288,075 B2 | 5/2019 | Ishiba |
| 10,451,504 B2 | 10/2019 | Campbell et al. |
| 10,479,503 B2 | 11/2019 | Sikora et al. |
| 10,519,013 B2 | 12/2019 | Curran et al. |
| 10,676,190 B2 | 6/2020 | Mitchell et al. |
| 10,870,558 B2 | 12/2020 | Sikora et al. |
| 10,899,586 B2 | 1/2021 | Cranney, III |
| 10,918,892 B2 | 2/2021 | Dickson |
| 10,940,061 B2 | 3/2021 | Sikora et al. |
| 10,960,976 B2 † | 3/2021 | Bosma |
| 11,008,198 B2 | 5/2021 | Sikora et al. |
| 11,142,316 B2 | 10/2021 | Sikora et al. |
| 11,142,433 B2 | 10/2021 | Sikora et al. |
| 11,209,836 B1 | 12/2021 | Sikora et al. |
| 11,339,034 B2 | 5/2022 | Sikora et al. |
| 11,370,642 B2 | 6/2022 | Markwell |
| 2002/0113448 A1 | 8/2002 | Kazerooni et al. |
| 2003/0085319 A1 | 5/2003 | Wagner et al. |
| 2003/0121024 A1 | 6/2003 | Hill et al. |
| 2003/0220177 A1 | 11/2003 | Orlando |
| 2004/0026349 A1 | 2/2004 | Colgate et al. |

(56) References Cited

U.S. PATENT DOCUMENTS

| | | |
|---|---|---|
| 2004/0032140 A1 | 2/2004 | Solstad |
| 2005/0072965 A1 | 4/2005 | Sanders et al. |
| 2005/0242237 A1 | 11/2005 | Scott |
| 2006/0163892 A1 | 7/2006 | Nguyen et al. |
| 2007/0200032 A1 | 8/2007 | Eadie et al. |
| 2009/0004004 A1 | 1/2009 | Vincenzi |
| 2009/0152391 A1* | 6/2009 | McWhirk ............... B64B 1/70 244/30 |
| 2010/0012771 A1 | 1/2010 | Jess |
| 2010/0176618 A1 | 7/2010 | Souke et al. |
| 2010/0237183 A1 | 9/2010 | Wilson et al. |
| 2010/0291707 A1 | 11/2010 | Mirkin et al. |
| 2010/0319910 A1 | 12/2010 | Ives et al. |
| 2011/0192932 A1 | 8/2011 | Brenner et al. |
| 2012/0006779 A1 | 1/2012 | Mills et al. |
| 2012/0145832 A1 | 6/2012 | Schuster |
| 2012/0150364 A1 | 6/2012 | Tillotson et al. |
| 2012/0271582 A1 | 10/2012 | Bageshwar et al. |
| 2012/0292434 A1 | 11/2012 | Welsh |
| 2012/0293177 A1 | 11/2012 | Dodds |
| 2013/0054054 A1 | 2/2013 | Tollenaere et al. |
| 2013/0056586 A1 | 3/2013 | Occhiato et al. |
| 2013/0270393 A1 | 10/2013 | Shrapnel |
| 2013/0299634 A1 | 11/2013 | Haggard |
| 2014/0154965 A1 | 6/2014 | Han et al. |
| 2014/0224755 A1 | 8/2014 | Eriksson et al. |
| 2014/0252170 A1 | 9/2014 | Prud'Homme-Lacroix |
| 2014/0333232 A1 | 11/2014 | Verheyen |
| 2015/0041598 A1 | 2/2015 | Nugent et al. |
| 2015/0151837 A1 | 6/2015 | Sane et al. |
| 2015/0360779 A1 | 12/2015 | Behrens et al. |
| 2016/0009393 A1 | 1/2016 | Repp et al. |
| 2016/0031683 A1 | 2/2016 | Fenker et al. |
| 2016/0048131 A1 | 2/2016 | Lesperance et al. |
| 2016/0236779 A1 | 8/2016 | Thomas et al. |
| 2016/0297650 A1 | 10/2016 | Bang |
| 2016/0332728 A1 | 11/2016 | Winfree et al. |
| 2016/0340030 A1 | 11/2016 | Roussey et al. |
| 2016/0340035 A1 | 11/2016 | Duru |
| 2016/0340039 A1 | 11/2016 | Waltner et al. |
| 2017/0052676 A1 | 2/2017 | Pulier et al. |
| 2017/0073055 A1 | 3/2017 | Song |
| 2017/0088261 A1 | 3/2017 | Sequeira et al. |
| 2017/0129749 A1 | 5/2017 | Mijangos et al. |
| 2017/0138737 A1 | 5/2017 | Cordova et al. |
| 2017/0197718 A1 | 7/2017 | Buchmueller |
| 2017/0217566 A1 | 8/2017 | Ichinose |
| 2017/0276139 A1 | 9/2017 | Ishiba |
| 2017/0284795 A1 | 10/2017 | Carlson et al. |
| 2017/0291707 A1 | 10/2017 | Veronesi et al. |
| 2018/0072404 A1 | 3/2018 | Prager et al. |
| 2018/0099748 A1 | 4/2018 | Lesperance et al. |
| 2018/0208309 A1 | 7/2018 | Wang |
| 2018/0229855 A1 | 8/2018 | Sane et al. |
| 2018/0252616 A1 | 9/2018 | Bryson et al. |
| 2018/0282130 A1 | 10/2018 | Kale et al. |
| 2018/0339891 A1 | 11/2018 | Ijadi-Maghsoodi et al. |
| 2019/0031474 A1 | 1/2019 | Stilborn et al. |
| 2019/0033892 A1 | 1/2019 | Gomez et al. |
| 2019/0055111 A1 | 2/2019 | Cranney, III |
| 2019/0193827 A1 | 6/2019 | Zerweckh |
| 2019/0236370 A1 | 8/2019 | Man |
| 2019/0241267 A1 | 8/2019 | Sikora et al. |
| 2019/0337776 A1 | 11/2019 | Fanello et al. |
| 2020/0087121 A1 | 3/2020 | Ohayon et al. |
| 2020/0180763 A1 | 6/2020 | Schütz et al. |
| 2020/0182252 A1 | 6/2020 | Nakasuji et al. |
| 2020/0210704 A1 | 7/2020 | Han et al. |
| 2020/0231415 A1 | 7/2020 | Sikora et al. |
| 2020/0271270 A1 | 8/2020 | Sikora et al. |
| 2020/0369492 A1 | 11/2020 | Sikora et al. |
| 2020/0400330 A1 | 12/2020 | Przybylski et al. |
| 2021/0371250 A1 | 12/2021 | Bedgood et al. |
| 2021/0371252 A1 | 12/2021 | Sikora et al. |
| 2022/0121225 A1 | 4/2022 | Sikora et al. |
| 2022/0135378 A1 | 5/2022 | Sikora et al. |
| 2022/0274696 A1 | 9/2022 | Sikora et al. |
| 2022/0274809 A1 | 9/2022 | Sikora et al. |
| 2022/0277472 A1 | 9/2022 | Birchfield et al. |
| 2022/0281721 A1 | 9/2022 | Sikora et al. |
| 2022/0371736 A1 | 11/2022 | Sikora et al. |

FOREIGN PATENT DOCUMENTS

| | | |
|---|---|---|
| GB | 2457149 A | 8/2009 |
| JP | H04256686 A | 9/1992 |
| JP | H07179288 A | 7/1995 |
| JP | H09317795 A | 12/1997 |
| JP | H10305989 A | 11/1998 |
| JP | H1111859 A | 1/1999 |
| JP | 2013203394 A | 10/2013 |
| JP | 2016210607 A | 12/2016 |
| JP | 2017500257 A | 1/2017 |
| JP | 2018140860 A | 9/2018 |
| WO | 2011012915 A1 | 2/2011 |
| WO | 2014076189 A1 | 5/2014 |
| WO | 2018234670 A1 | 12/2018 |
| WO | 20171181 A1 | 1/2019 |

OTHER PUBLICATIONS

Extended European Search Report and Search Opinion, Application No. EP 19 751 097.7, dated Aug. 31, 2021, 15 pages.

Internal Search Report dated Apr. 30, 2020 for PCT/US2020/017790, filed Feb. 11, 2020.

International Search Report dated Apr. 3, 2019, for PCT/US19/13603 filed Jan. 15, 2019.

International Search Report in PCT/US2020/062414, dated Feb. 19, 2021, entire document.

International Search Report dated May 27, 2020 for PCT.US20/19967 filed Feb. 26, 2020.

International Search Report dated Oct. 6, 2020, for PCT/US2020/042936, filed Jul. 2020.

Phillip J. McKerrow, The design of a tethered aerial robot, Faculty of Informatics—Papers (Archive) Faculty of Engineering and InformationSciences University of Wollongong, Oct. 4, 2007, pp. 1-8, University of Wollongong, Australia, https://ro.uow.edu.au/infopapers/519.

Written Opinion in PCT/US2020/062414, dated Feb. 19, 2021, entire document.

Written Opinion dated Apr. 3, 2019, for PCT/US19/13603, filed Jan. 15, 2019.

Written Opinion dated May 27, 2020, for PCT/US20/19967, filed Feb. 26, 2020.

Written Opinion dated Oct. 6, 2020 for PCT/US2020/042936 filed Jul. 21, 2020.

Young, L.A., "Enhanced Rescue Lift Capability", 63rd Annual Forum of the AHS international, Virginia Beach, VA, May 1-3, 2007 (May 2007). FIG.2,5,12,16, Abstract pp. 6-12.

Author: Multiple Contributors, Nonlinear Filter, Wikipedia, date Jul. 27, 2017 (YYYY-MM-DD), permanent link to this page/date: https://en.wikipedia.org/w/index.php?title=Nonlinear_filter&oldid=792622576, World-wide.

Author: Multiple Contributors, Optical Filter, Wikipedia, date Oct. 15, 2017 (YYYY-MM-DD), permanent link to this page/date: https://en.wikipedia.org/w/index.php?title=Optical_filter&oldid=805441857, World-wide.

\* cited by examiner
† cited by third party

CONTROL OF DRONE-LOAD SYSTEM METHOD, SYSTEM, AND APPARATUS

CROSS-REFERENCE TO RELATED APPLICATIONS

This application is a continuation of U.S. patent application Ser. No. 17/875,873, filed Jul. 28, 2022; U.S. patent application Ser. No. 17/875,873 is a continuation of U.S. patent application Ser. No. 17/161,388, filed Jan. 28, 2021, and issued as U.S. Pat. No. 11,142,316 on Oct. 12, 2021; U.S. patent application Ser. No. 17/875,873 is a continuation of Patent Cooperation Treaty Application Number PCT/US21/15561, filed Jan. 28, 2021; U.S. patent application Ser. No. 17/875,873 is a non-provisional of U.S. Provisional Patent Application Ser. No. 62/966,851, filed Jan. 28, 2020; U.S. patent application Ser. No. 17/161,388 is a continuation in part of U.S. patent application Ser. No. 16/988,373 filed Aug. 7, 2020; U.S. patent application Ser. No. 17/161,388 is a non-provisional of U.S. Provisional Patent Application Ser. No. 62/966,851 filed Jan. 28, 2020; U.S. patent application Ser. No. 17/161,388 is a continuation in part of Patent Cooperation Treaty Application Number PCT/US19/13603, filed Jan. 15, 2019; Patent Cooperation Treaty Application Number PCT/US21/15561 is a non-provisional of U.S. Provisional Patent Application Ser. No. 62/966,851, filed Jan. 28, 2020; U.S. patent application Ser. No. 16/988,373 is a continuation of Patent Cooperation Treaty Application Number PCT/US19/13603, filed Jan. 15, 2019; U.S. patent application Ser. No. 16/988,373 is a nonprovisional of non-provisional of U.S. Provisional Patent Application Ser. No. 62/757,414, filed Nov. 8, 2018; U.S. patent application Ser. No. 16/988,373 is a nonprovisional of non-provisional of U.S. Provisional Patent Application Ser. No. 62/627,920, filed Feb. 8, 2018; Patent Cooperation Treaty Application Number PCT/US19/13603 is a non-provisional of U.S. Provisional Patent Application Ser. No. 62/757,414, filed Nov. 8, 2018; and Patent Cooperation Treaty Application Number PCT/US19/13603 is a non-provisional of U.S. Provisional Patent Application Ser. No. 62/627,920, filed Feb. 8, 2018; the benefit of the filing dates of the foregoing applications are claimed by the present application and the subject matter of the foregoing applications is incorporated into this application by this reference.

FIELD

This disclosure is directed to improved systems and methods for and related to control of drone-load system, including a load carried by a drone.

BACKGROUND

Loads may be transported as a load secured to or suspended from an aerial drone or another carrier. When drones or other carriers transport a load, the load may be secured tightly to the drone, such that the two do not have significant independent motion or the load may be suspended below the drone on a suspension cable.

During such operations, a center of mass of the load may be unknown or difficult to obtain prior to take-off. During such operations, the center of mass of the load and or of a drone-load system may change during the operation, such as if the load is suspended on a cable and if the load swings or if a mass within the load shifts. Shifting of mass within a load can severely and detrimentally complicate control a drone-load system, whether the load is suspended on a cable or is tightly secured to the drone. In addition, the center of mass of the drone-load system changes as the load is delivered. In addition, during such operations, loads and drones are subject to winds and other external and internal factors that may cause the load and the drone-load system to move in an unstable or hazardous manner or which may complicate delivery of the load to a target.

Weight and volume of equipment in and carried by a drone must be reduced to reduce fuel consumption, increase speed, increase load capacity, and the like.

During an operation in which a load is carried by a drone or another carrier (carriers comprise helicopters, fixed wing aircraft, cranes, or the like), whether the load is suspended on a cable or is tightly secured to the carrier, observed motion of the suspended load and of the carrier may include the following components: vertical translation (motion up and down) along the Y axis (referred to herein as "vertical translation"), horizontal translation along either or both the X and Z axis, rotation or "yaw" about the Y axis, roll (rotation about the X axis), and pitch (rotation about the Y axis). Roll and pitch may occur primarily with respect to a drone or other aerial carrier and a tightly secured load but may also occur with respect to a suspended load. Horizontal translation can manifest as lateral motion or as conical pendulum motion of one or both of the load and the carrier, with the pivot point of the pendulum being between the load and the carrier ("pendular motion"); pendular motion generally also includes a component of vertical translation. Pendular motion primarily occurs with respect to suspended loads, though it can also affect the carrier or the carrier-load system (also referred to herein as a "drone-load system").

In addition, when a drone or other carrier transports a load which is a significant percentage (e.g. greater than 1%) of the mass of the carrier and the carrier is not securely anchored to the ground, such as in a drone-load system, momentum transfer between the carrier and the load or changes in the center of mass of the drone-load system may result in an observable change in rotation, position, or velocity of either the drone or the load, even when there may be net conservation of momentum in a system comprising both objects.

Motion in a drone-load system may be effected by movement of the suspension cable, pulling in (contraction) or paying out (extension) the suspension cable, by movement of the drone (e.g. caused by thrusters of the drone or by forces acting on the drone), movement of the load, movement of a center of mass of the load, differences in momentum between the load and the drone, transfer of momentum between the carrier and the load, changes in the center of mass of the drone-load system, as well as by wind—including propeller wash and environmental wind—impacts, and external forces.

Yaw, vertical and horizontal translation, and pendular motion can complicate lift and delivery operations, interfere with operation of control systems, can result in non-linear control dynamics which result in mission failure, cause delays, damage equipment, and may result in injury or death of people on the ground. Yaw, vertical and horizontal translation, and pendular motion can also interfere with bringing a load into or delivering a load to a location. For example, delivery of a load to a location may be significantly complicated by pendular motion or yaw of the load, even if the location is stable and is not also subject to heave, roll, or pitch, as it may be. One or more components of undesired motion of the load may accelerate or grow more pronounced if a suspension cable shortens, such as if a load is drawn up to a drone. Paying out of a suspension cable may result in the carrier gaining elevation, while shortening the suspension cable may result in the carrier descending, either of which may not be a desired result. Vertical translation, horizontal translation, and pendular motion of a load and of a carrier may produce momentum transfer and may interact with a control system of the drone to produce unpredictable and potentially dangerous quasi-oscillatory interaction between the load and the drone ("quasi-" in the sense that the natural frequency of the system may not normally include the response of the drone's control system to forces from of the load).

In addition, some suspended load and delivery operations may involve an obstacle, such as a tree, building, bridge, overhang, or an environmental condition, such as wind, that may interfere with one or more of the carrier, load, and/or suspension cable. It may be desirable to move the suspended load relative to such an obstacle, or for other reasons, in a manner which does not involve the load hanging at a lowest energy position below the drone.

In addition, carriers, including drones, may operate or work with multiple pieces of equipment. One such piece of equipment may be a carrier hoist system. The hoist system on a carrier may be used to lift an object, such as a person, litter, load, or the like from the ground to the carrier, above, or vice versa; this may be referred to as a hoist operation. Hoists may also be used to lift a package to the drone and may hold the package to the drone. In addition, multiple pieces of equipment may be used to aid or support the package delivery or drone-load operation, such as weight scales, package delivery equipment, package slings, a fans proximate to the load, a jungle penetrator, rescue stokes, rescue litter, hose, or other load. If used, such equipment may need to be controlled, which may not be possible, may be inconvenient, or may not be fast enough to respond to circumstances of the drone-load system.

Mechanical and logical complexity of equipment used in drone-load operations is increasing. For example, equipment may perform services for the load and or for the drone; for example, the weight of a load may need to be measured before it is picked up; for example, a hoist may reel in or pay out suspension cable; for example, batteries in the carrier may need to be recharged or replaced, and the like.

Lack of integration may require that many such services be provided with the assistance of people or through execution of additional processes. Performance of such services may not be possible, may be costly, inconvenient, distracting, or dangerous, whether to such persons or to others or property in the vicinity. Inadequate integration between drones and other systems may result in, for example, prematurely discharged batteries, damage to equipment, damage to transported packages, damage to surroundings, injury, loss of life, and failure to initiate or carry out missions, including failure of life saving missions.

In addition, flight dynamics of a drone or other carrier are made more complex on take-off, during operation, and following delivery of the load due to, for example, changes in a center of mass of the drone-load system, interaction of the drone-load system with the environment, and the like following deposition and/or release of a load at a target.

In addition, a control system for a drone or other carrier may produce undesirable control output when the load approaches a significant percentage of the mass of the carrier and or when the drone-load system includes fans or other thrusters at or proximate to a load, in addition to thrusters at the carrier.

Operation of drone-load systems may be improved, made less hazardous, or made more likely if apparatuses, systems, and methods are provided to enhanced control of a load-bearing drone, control of a hoist of the drone, control of the load by the drone, and/or enhanced control of the load independent of the drone.

DETAILED DESCRIPTION

Figure 1A:
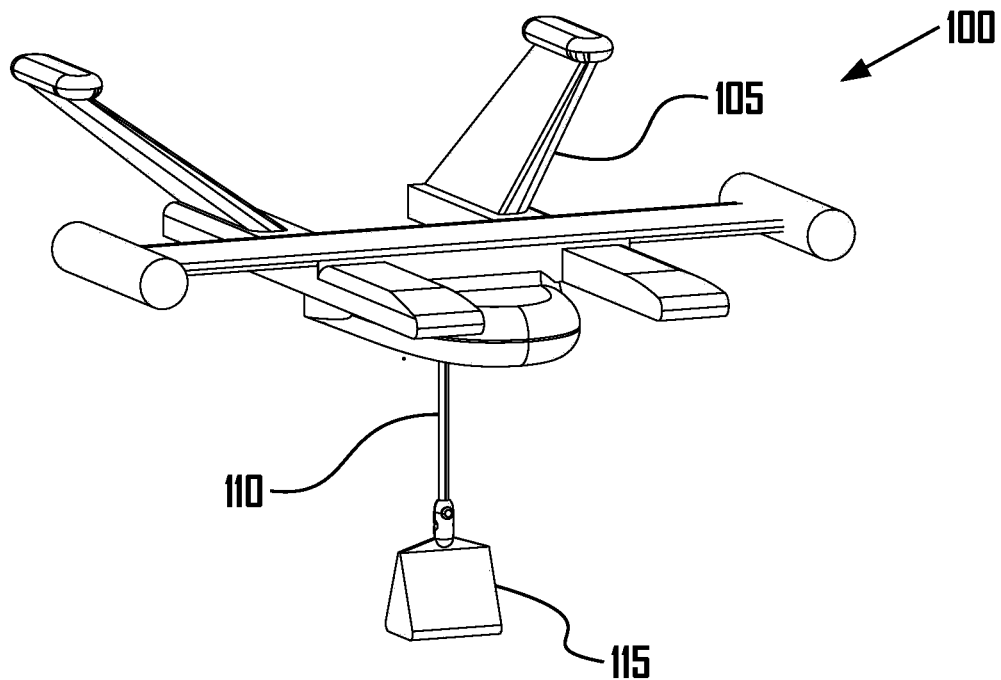
FIG. 1A is a top oblique parallel projection view of a first example of a drone carrying a load via a suspension cable, wherein at least one of the drone, suspension cable, or load comprise a sensor suite and a real-time localization and control enhancement system ("sensor enhanced control system"), in accordance with an embodiment.

It is intended that the terminology used in the description presented below be interpreted in its broadest reasonable manner, even though it is being used in conjunction with a detailed description of certain examples of the technology. Although certain terms may be emphasized below, any terminology intended to be interpreted in a restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "coupled," or any variant thereof means any coupling, either direct or indirect between two or more elements; a coupling between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or" in reference to a list of two or more items, covers all of the following interpretations of the word: any of the items in the list, all of the items in the list, and any combination of one or more of the items in the list. References may be made herein to modules, routines, and subroutines; generally, it should be understood that a module or routine is a software program executed by computer hardware and that a subroutine is a software program executed within a module or routine. However, modules or routine discussed herein may be executed within another module or routine and submodules or subroutines may be executed independently (modules or routines may be submodules or subroutines and vice versa).

As used herein, "releasable," "connect," "connected," "connectable," "disconnect," "disconnected," and "disconnectable" refers to two or more structures which may be connected or disconnected, generally without the use of tools (examples of tools including screwdrivers, pliers, wrenches, drills, saws, welding machines, torches, irons, and other heat sources) and generally in a repeatable manner. As used herein, "attach," "attached," or "attachable" refers to two or more structures or components which are attached through the use of tools or chemical or physical bonding. As used herein, "secure," "secured," or "securable" refers to two or more structures or components which are either connected or attached.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used herein, "thrusters" refers to fans, or propellers, as are found, for example, in electric ducted fans ("EDF"), as well as to compressed air jets, hydrogen peroxide rockets, solid fuel rockets, or other sources of thrust fluid as well as to gyroscopes. As used herein, a "drone thruster" is a thruster which provides thrust to lift and or control a drone. As used herein, a "load thruster" is a thruster located proximate to a load, wherein the load is suspended below a drone or other carrier on a suspension cable.

In various embodiments, as described further herein, sensors of or proximate to one or both of a drone and or a load obtain information regarding the position, orientation, or motion of the drone-load system, including of the drone and of the load. One or more logical control modules obtain the sensor data and fuse the sensor data in a non-linear filter according to a system model of the drone-load system, with feedback from at least one of a functional mode or command state of the control module, a thrust and orientation mapping, or a fan mapping. The system model may comprise, for example, a mass of the drone, a mass of the load, a length between the drone and the load, an inertia of the load, an inertia of the drone, a center of mass of the drone-load system, an impulse force of the load thruster, an impulse force of the drone thruster, a rotational motion of the load, a rotational motion of the drone, a pendular motion of the load, a pendular motion of the drone, a movement of the load over time through an absolute coordinate space, and a movement of the drone over time through the absolute coordinate space.

The logical control modules obtain feedback from the functional mode or command state, such idle, maintain location or position relative to a carrier, maintain location, or position relative to a one or more other drones, maintain location, or position relative to a target location, maintain location, or position relative to a location on the ground, move to a location, move between a first location and a second location, hold position, obstacle avoidance, package drop, or direct control. The logical control modules further decide how to output control based on the functional mode or command state. The logical control modules output control signals to actuators such as drone thrusters, load thrusters, control and or to a hoist.

Together, the sensors, logical control modules, and actuators may be referred to herein as a drone and load control system, drone, and suspended load stability system, or as a sensor enhanced control system (referred to together as, "SECS").

As described, an SECS may thereby provide enhanced control of a drone, of a load transported or delivered by a drone, of a drone-load system, or control of a load, independent from a drone.

An SECS may determine a mass of a load, a center of mass of one or more of the drone, the load, or the drone-load system, determine if a flight control of a drone-load system may be exceeded, determine relative locations of drone, load, and/or target, determine real time relative movement of these components and locations, output force from actuators to move or control a load, to compensate for momentum transfer, wind, and other movement influences through control of actuators, such as drone thrusts, load thrusts, control surfaces of the drone, and or a hoist of a suspension cable.

Vector thrust force produced by a drone thruster and or a load thruster may be used to counteract yaw and pendular motion of the load, of the drone-load system, may be used to translate a load horizontally or rotate a load, such as to avoid an obstacle or to move a load into an offset position relative to a normal lowest-energy hanging position, or may otherwise be used to control the fine location and orientation of a load, independently from and or in conjunction with the drone.

Consequently, an SECS enhances mission safety and improves performance of drone and load operations, including pickup and delivery of packages by drones.

Reference is now made in detail to the description of the embodiments illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

FIG. 1A is a top oblique parallel projection view of a first example of drone 105 carrying load 115, wherein at least one of drone 105 and or load 115 and or suspension cable 110 comprise a sensor suite and a real-time localization and control enhancement system ("sensor enhanced control system" or "SECS"), in accordance with an embodiment. Together, these components may be referred to herein as drone and sensor enhanced control system 100.

Load 115 may comprise a package ready to be delivered as-is or load 115 may comprise a load frame which holds or contains a package to be delivered. Examples of a load frame are discussed further herein.

Sensor enhanced control system 100 may comprise, for example, a processor and a memory. The processor and memory may be present in the drone-load system, such as in the drone and/or in a unit or housing secured to the load and/or suspension cable 110, such as in sensor suite and/or communications module 225 in or secured to load securement structure 230 (discussed in relation to FIG. 2). The memory may comprise instructions or code for modules such as, for example, operational module 1400 and/or decision and control module 1500. When executed by the processor, these modules may provide enhanced control of drone thrusters and or of load thrusters, as discussed herein.

Figure 1B:
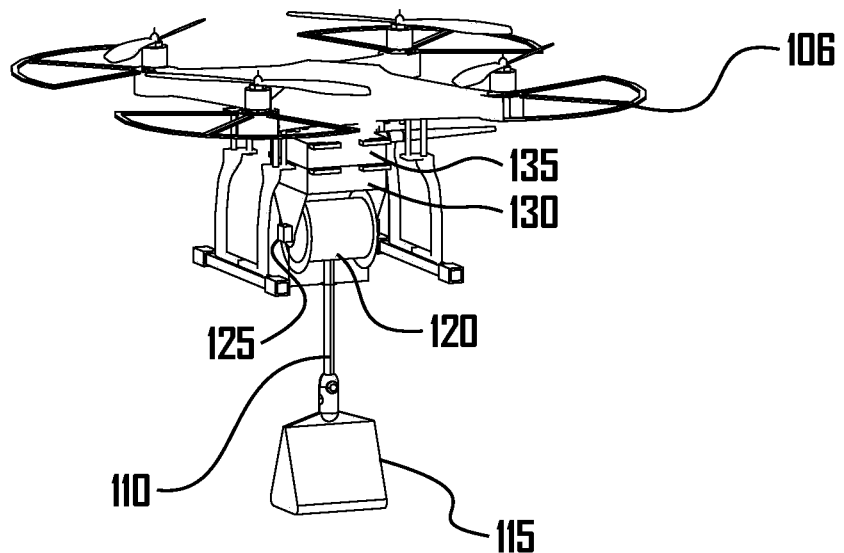
FIG. 1B is a top oblique parallel projection view of a second example of a drone carrying a load via a suspension cable, wherein at least one of the drone, suspension cable, or load comprise a sensor suite and a real-time localization and control enhancement system ("sensor enhanced control system"), in accordance with an embodiment.

An example of drone 105 is illustrated herein as a winged aircraft, though in embodiments, drone 105 may have one or more propellers, such as a drone helicopter, quad-copter, tilt-wing craft, or the like. An example of a drone as quadcopter drone 106 is illustrated in FIG. 1B. Drone 105 may comprise drone thrusters, such as vertically oriented drone thrusters, horizontally oriented drone thrusters, and or tiltrotor drone thrusters, as may be used in vertical take-off and landing aircraft.

FIG. 1B is a top oblique parallel projection view of a second example of drone 106 carrying load 115 via suspension cable 110, wherein at least one of drone 106, suspension cable 110, or load 115 comprise a sensor suite and a real-time localization and control enhancement system ("sensor enhanced control system"), in accordance with an embodiment. In addition to elements labeled and discussed in relation to FIG. 1A, FIG. 1B illustrates hoist 120, hoist sensor and controller 125, electronics box 130 and electronics box 135. Hoist 120 may be used to reel in or pay out or extend and contract suspension cable 110 and to thereby change a distance between drone 106 and load 115. Hoist 120 may be used in, with, or by drone 105. Hoist 120 may be controlled by actuators, including motors, in or of hoist sensor and controller 125.

Hoist sensor and controller 125 may obtain sensor information, such as cable length and forces on the hoist from a reel of the hoist, such as by a cable length encoder and or a reel torque encoder of a reel of the hoist.

Hoist sensor and controller 125 may comprise electrical components, including computer processors, computer memory, signal processing, logical components, and actuators, including a reel and other actuators. Such components are also discussed herein in relation to hoist logical components 1080.

In computer memory or in logic embodied in circuits within hoist sensor and controller 125 may be a hoist module. The hoist module may comprise logic to operate hoist 120. The hoist module may obtain data or information, such as from a cable length encoder and reel torque encoder and may provide this data or information to other processes. The hoist module may receive data, information, or instructions from, for example, operational module 1400 and decision and control module 1500. The hoist module may implement instructions, such as to wind in or unwind (or pay out) suspension cable 115, to communicate with other processes, to communicate with sensors, or the like.

Operational module 1400 and or decision and control module 1500 may combine the hoist information with machine-vision information and with other sensor information, such as from an inertial navigation system ("INS"), from LIDAR (possibly a portmanteau of "light and radar" or an acronym for "light detection and ranging"), from ultrasonic proximity sensors, from cameras or other machine-visions systems, and from other sensor input discussed herein to localize a package or load relative to a drone, relative to a target location, or relative to another object, to determine a center of mass of the drone-load system, and the like as discussed herein.

Machine-vision information may be produced through image capture by cameras and object detection of the drone and or load in such images. When integrated with information from cameras, INS, LIDAR systems, localized relative parameter and state information (including distance below a drone, elevation of the load relative to the drone or ground, forces on the suspension cable, relative orientation and position of the carrier, load and/or deployable equipment, and separate heading vectors of drone and load within a localized coordinate system) may be developed with low latency and high reliability. When absolute position or location information is available, such as from GPS or another radio navigation or absolute positioning system, absolute and relative localized information may be integrated. Integration of information from the hoist, machine-vision information, and information from inertial navigation, LIDAR, and/or absolute position systems may be performed using methods that comprise, for example, a Kalman Filter, such as an Unscented Kalman Filter ("UKF") and state model.

Figure 2:
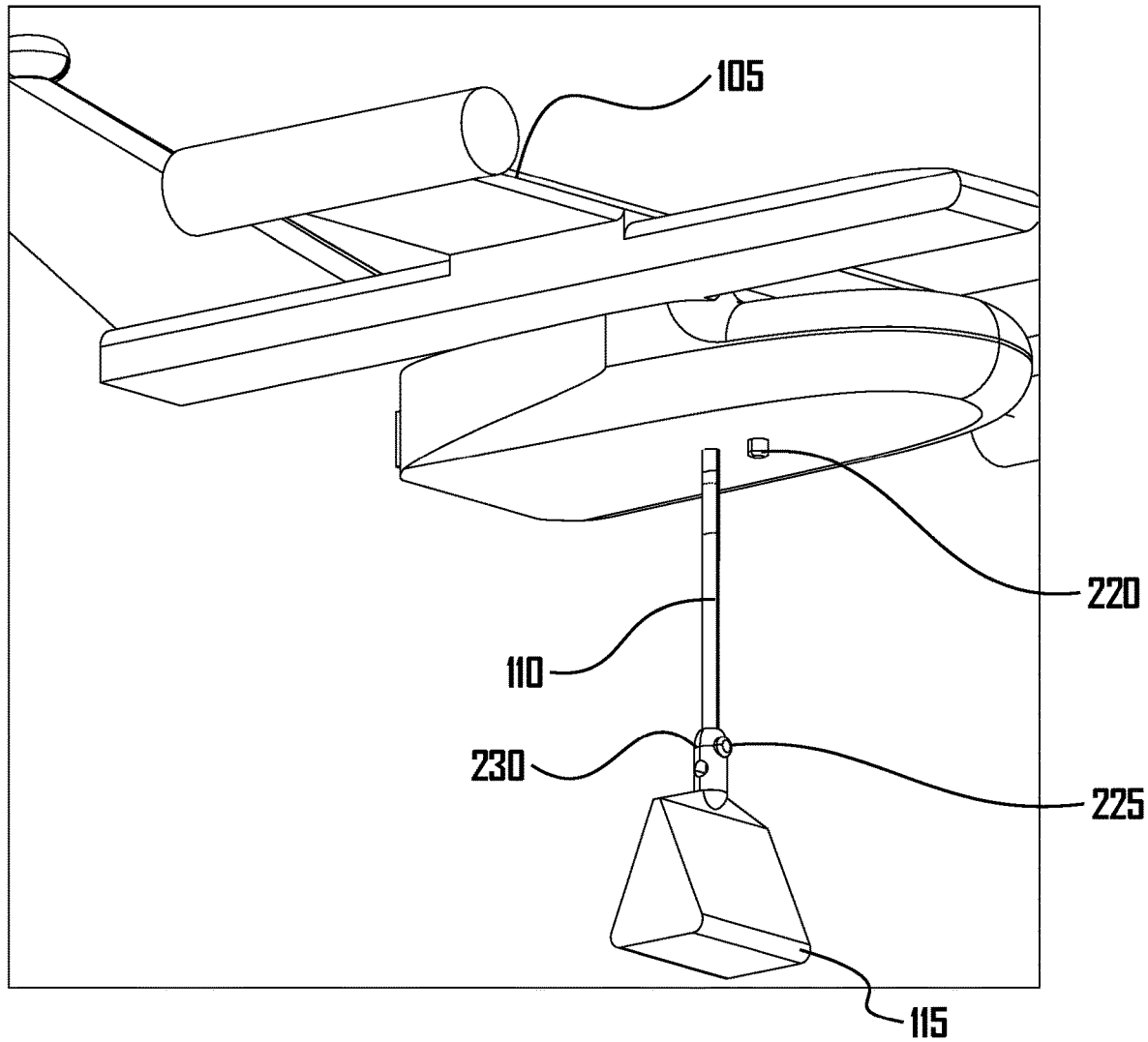
FIG. 2 is bottom oblique parallel projection of a detail view of the sensor enhanced control system of FIG. 1, in accordance with an embodiment.

FIG. 2 is parallel projection of a detail view of drone and sensor enhanced control system 100 of FIG. 1 from below, in accordance with an embodiment. Sensor suite and/or communications module 220 and sensor suite and/or communications module 225 may comprise suites of sensors and communications equipment.

Sensors in the sensor suites may comprise, for example, a vector navigation unit, which may include an inertial measurement unit ("IMU"). Sensor suite 110 may further comprise, for example, an inertial measurement system, an orientation measurement system, and an absolute position measurement system. The inertial measurement system ("IMS") may include 3 degrees of freedom (3DOF) accelerometers, gyroscopes, and gravitational sensors, which may comprise microelectromechanical systems (MEMS) sensors. The orientation measurement system may include a magnometer or magnetometer such as a compass, an inclinometer, a directional encoder, and a radio frequency relative bearing system. The absolute position measurement system may include global positioning system (GPS) sensors.

Sensors may further comprise a proximity sensor, such as a depth camera, or light detection and ranging (LIDAR) system (e.g., rotating or linear), and/or an optical sensor such as one or more cameras, infrared (IR) sensors, and/or distance or depth sensors. Proximity sensors may include ground height sensors. Optical sensors may also provide visual information to a user. This information may be communicated to remote devices by the processor, via a data link cable and/or the wireless transceiver. Proximity and optical sensors may provide modules with 360-degree awareness, to allow modules to determine distance between a sensor and points or objects in the environment, perform collision avoidance through detection of obstacles (e.g., a portion of a tree canopy), altering the course of the drone and or a load. The sensors may also be capable of providing ground (or water) position data to drone operators.

Additional sensors may include a strain sensor to gauge stain on a securement to a suspension cable, on a suspension cable, on a load, on clamps to a load, and the like. Additional sensors may include a rotational encoder or thruster speed sensor which may be incremental or absolute, and a shutdown pin presence sensor.

Sensor suite and or communications module 220 and sensor suite and or communications module 225 may comprise communications equipment, such as wireless systems 1331, such as a wireless transceiver, and or wired systems 1332. Such communications equipment may be used to communicate between sensor suite and or communications module 220 and sensor suite and or communications module 225 and or with other equipment or parties, including remote equipment.

Load securement structure 230 may secure suspension cable 110 to load 115. Load securement structure 230 may contain sensor suite and/or communications module 225.

Figure 17:
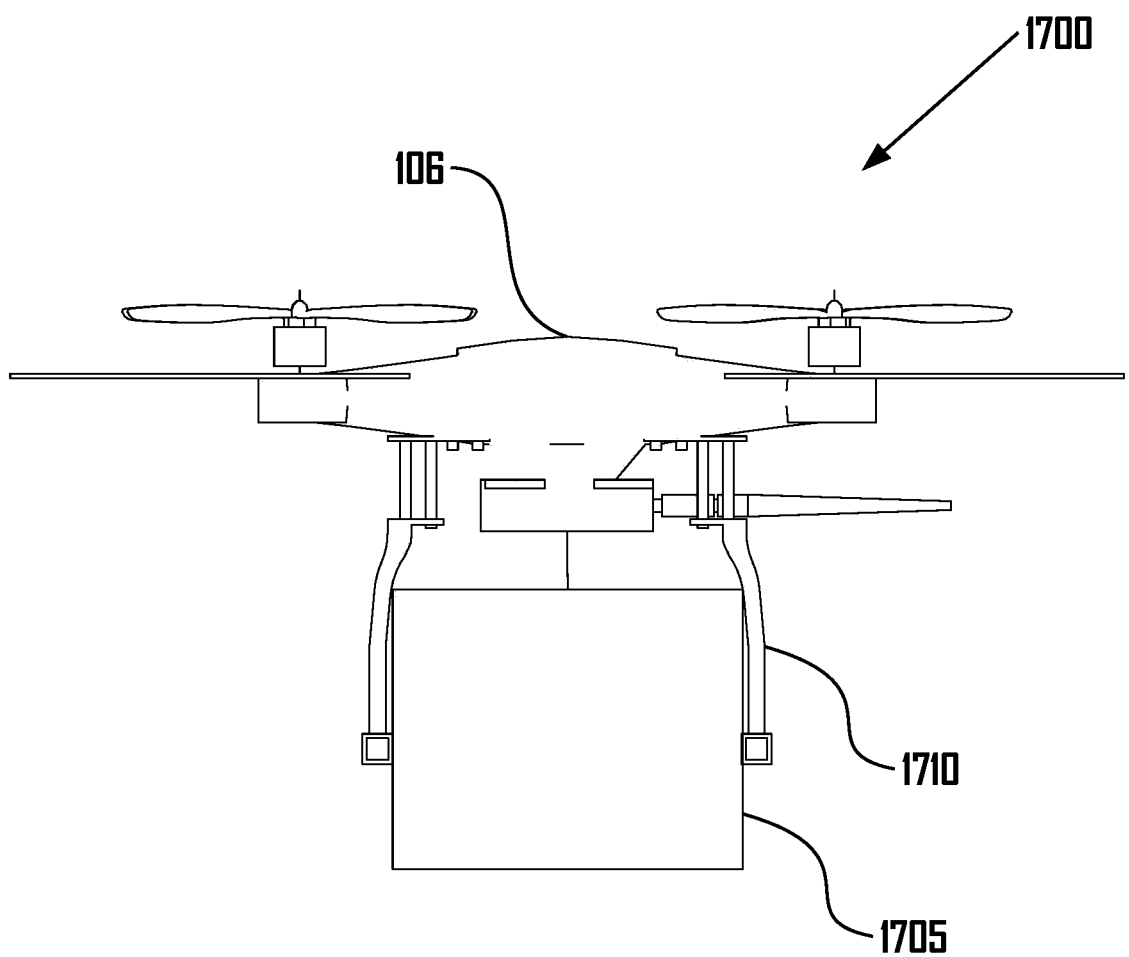
FIG. 17 is a front elevation parallel projection of a drone comprising a sensor enhanced control system ("SECS") and carrying a load, in accordance with an embodiment.

In embodiments, load securement structure 230 may comprise a clamp, straps, and the like, to secure a load to the drone. An example of such an embodiment is illustrated in FIG. 17, in which drone 106 comprises load-clamp legs 1710, which are clamped or otherwise secured to package 1705.

Figure 3:
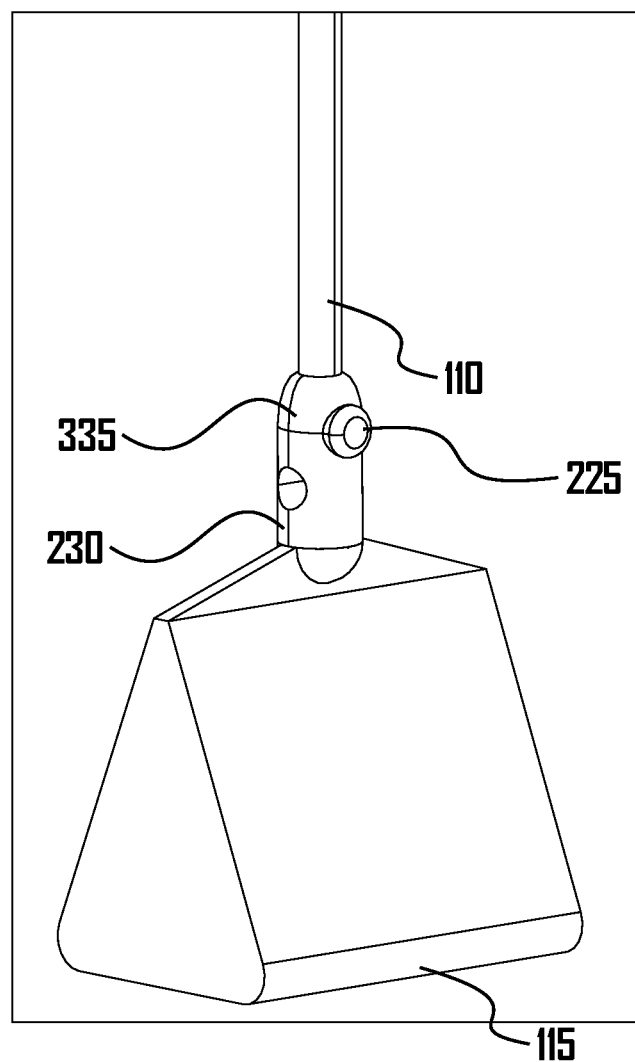
FIG. 3 is a top oblique parallel projection of a sensor suite and a load, in accordance with an embodiment.

FIG. 3 is top oblique parallel projection of sensor suite and/or communications module 225, load securement structure 230, load 115, and rotational coupling 335, in accordance with an embodiment. Rotational coupling 335 may be a component of load securement structure 230 or may be a separate component. Rotational coupling 335 may allow load 115 to rotate, without imparting significant rotational forces on suspension cable 110 or on a drone. Rotational coupling 335 may be between load 115 and load securement structure 230 and or between load securement structure 230 and suspension cable 110.

Figure 4:
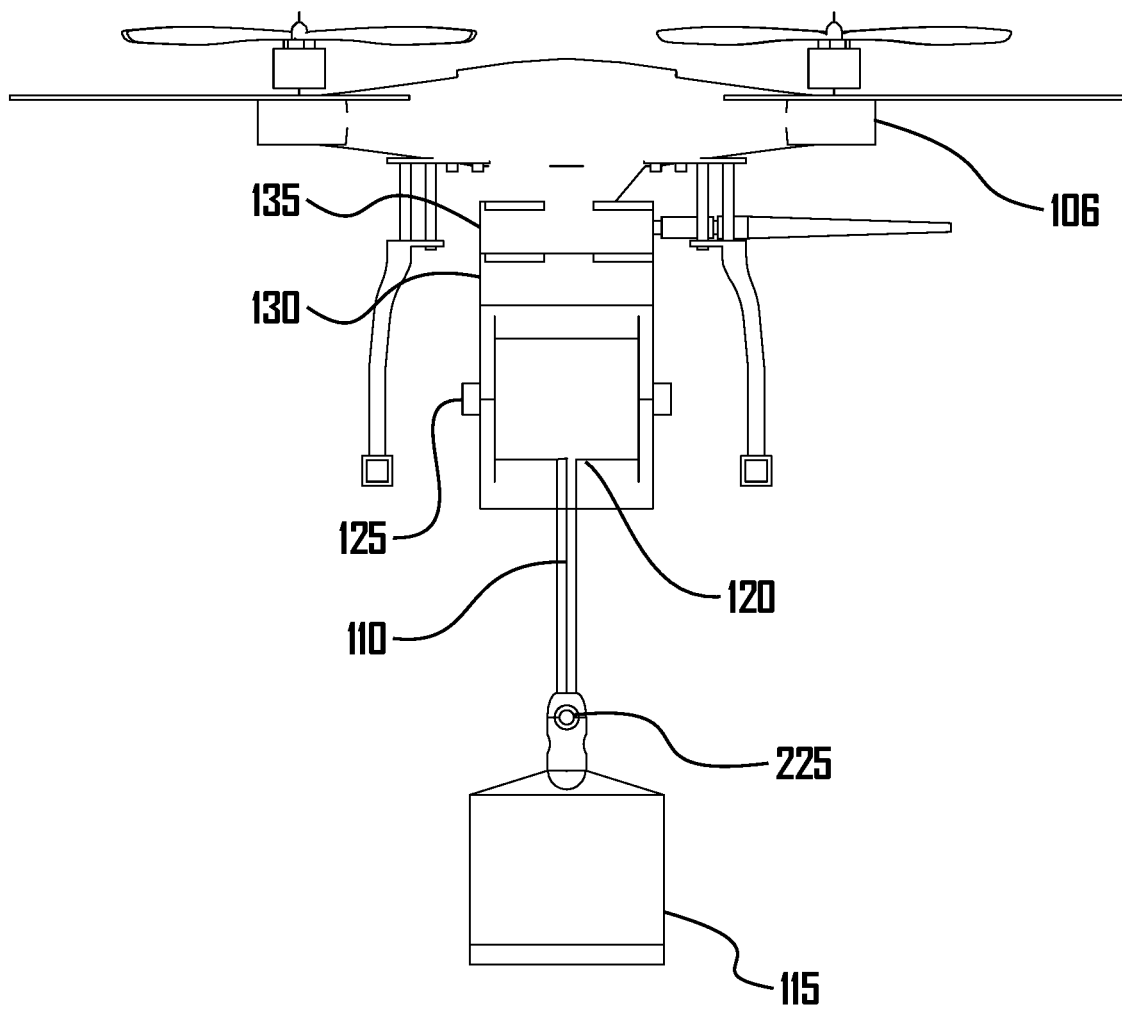
FIG. 4 is a front elevation parallel projection of a drone carrying a load and comprising a sensor enhanced control system, in accordance with an embodiment.

FIG. 4 is a front elevation parallel projection of drone 106 carrying load 115 via suspension cable 110, comprising a sensor suite and a sensor enhanced control system. Hoist 120 may be used by processor and modules, such as operational module 1400 and decision and control module 1500, to provide enhanced control of drone 106, of load 115 transported or delivered by drone 106, or control of load 115, as discussed herein.

Figure 5:
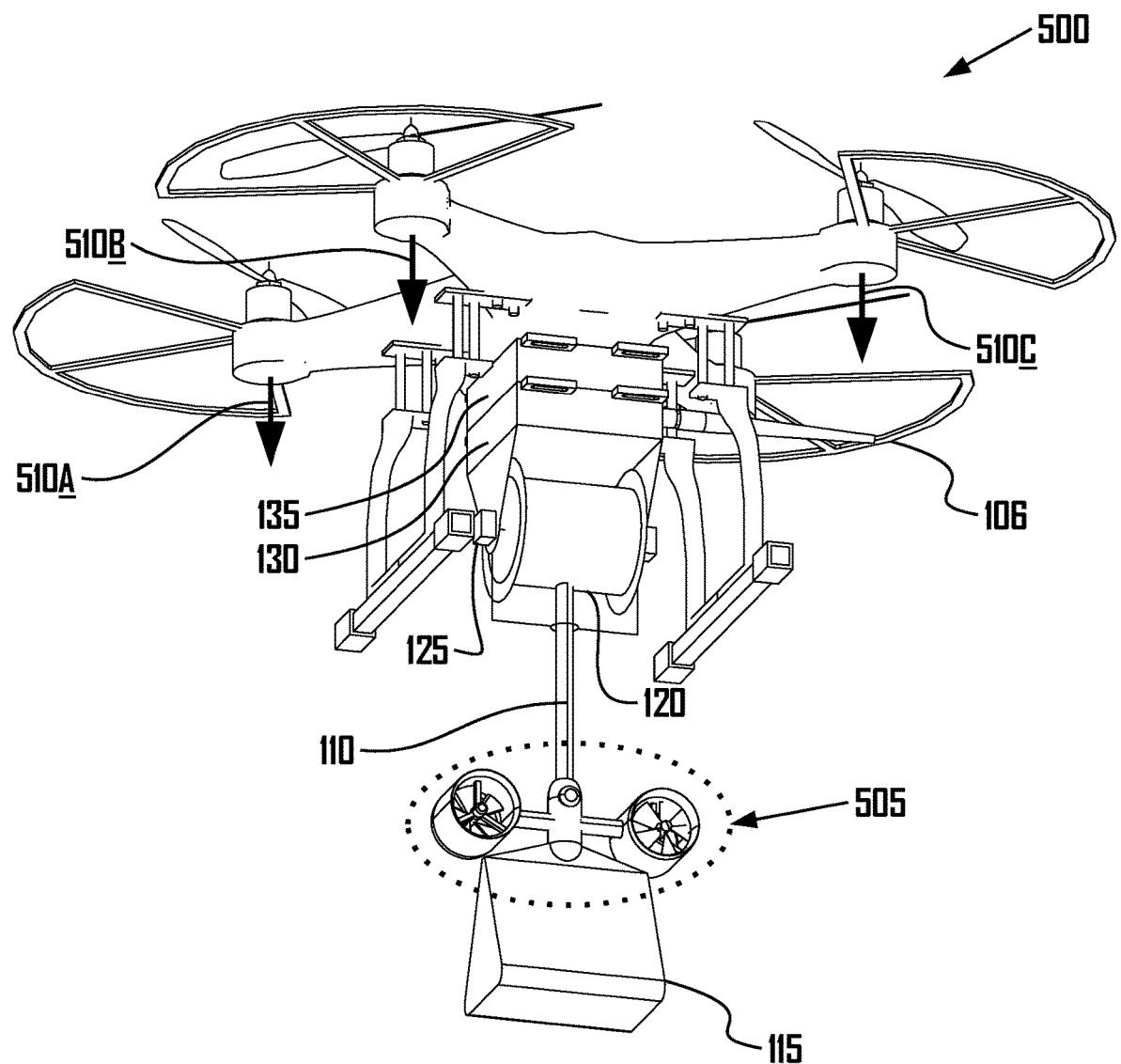
FIG. 5 is a bottom oblique parallel projection of a drone carrying a load and a sensor enhanced control system ("SECS"), in accordance with an embodiment.

FIG. 5 is a bottom oblique parallel projection of drone 106 carrying load 115 and a sensor enhanced control system ("SECS") with load thrusters 505, in accordance with an embodiment. SECS with load thrusters 505 and components thereof are discussed further in relation to FIG. 6. SECS with load thrusters 505 may be used by processor and modules, such as operational module 1400 and decision and control module 1500, to provide enhanced control of drone 105, of load 115 transported or delivered by drone 106, or control of load 115, as discussed herein.

For example, hoist 120 may be activated to shorten or lengthen cable 110, such as to pick up or deliver a package. In so doing, forces from load 115 on drone 106 change. As discussed herein, operational module 1400 and decision and control module 1500 may continuously determine a center of mass of the drone-load system, as well as other parameters of a system model and respond dynamically to these changes, such as to momentum transfer between the load and the drone and external perturbation, such as to winds or contact by external bodies. Operational module 1400 and decision and control module 1500 may control actuators, including hoist 120, via hoist sensor and controller 125, drone thrusters, e.g. sources of thrust 510A, thrust 5106, thrust 510C, other flight control surfaces, or load thrusters 505, e.g. to drive drone-load system 500 toward a then-current objective, such as one set by a functional mode or command state.

As discussed herein, operational module 1400 and decision and control module 1500 may continuously determine, including on take-off, whether a flight control parameter of the drone-load system is exceeded. For example, a drone with an available thrust from drone thrusters may be able to accommodate a mass of a load and a center of mass of the drone-load system with an available reserve for maneuvering, for overcoming headwinds, addressing tailwinds, and the like. If the load or center of mass of load characteristics of the drone-load system exceed a flight control parameter, operational module 1400 and decision and control module 1500 may end or discontinue a mission. The center of mass of the drone-load system may change as a distance between load and drone changes, as a center of mass of either drone or load changes (e.g. such as when a mass within a load shifts), as the drone may burn fuel, and the like.

As discussed herein, the system model may comprise a mass of the drone, a mass of the load, a length between the drone and the load, an inertia of the load, an inertia of the drone, a center of mass of the drone-load system, an impulse force of a load thruster, an impulse force of a drone thruster, a rotational motion of the load, a rotational motion of the drone, a pendular motion of the load, a pendular motion of the drone, a movement of the load over time through an absolute coordinate space, and a movement of the drone over time through the absolute coordinate space.

As discussed herein, actuators comprise hoists, thrusters (including drone thrusts and or load thrusters), and flight control surfaces. Flight control surfaces may comprise, e.g. wings, rudders, leading edge devices (slats, slots, extensions, droop flaps), trailing edge devices (flaps, flaperons), ailerons, spoilers, vortex generators, wing fences, strakes, chine, and fairings.

Figure 6:
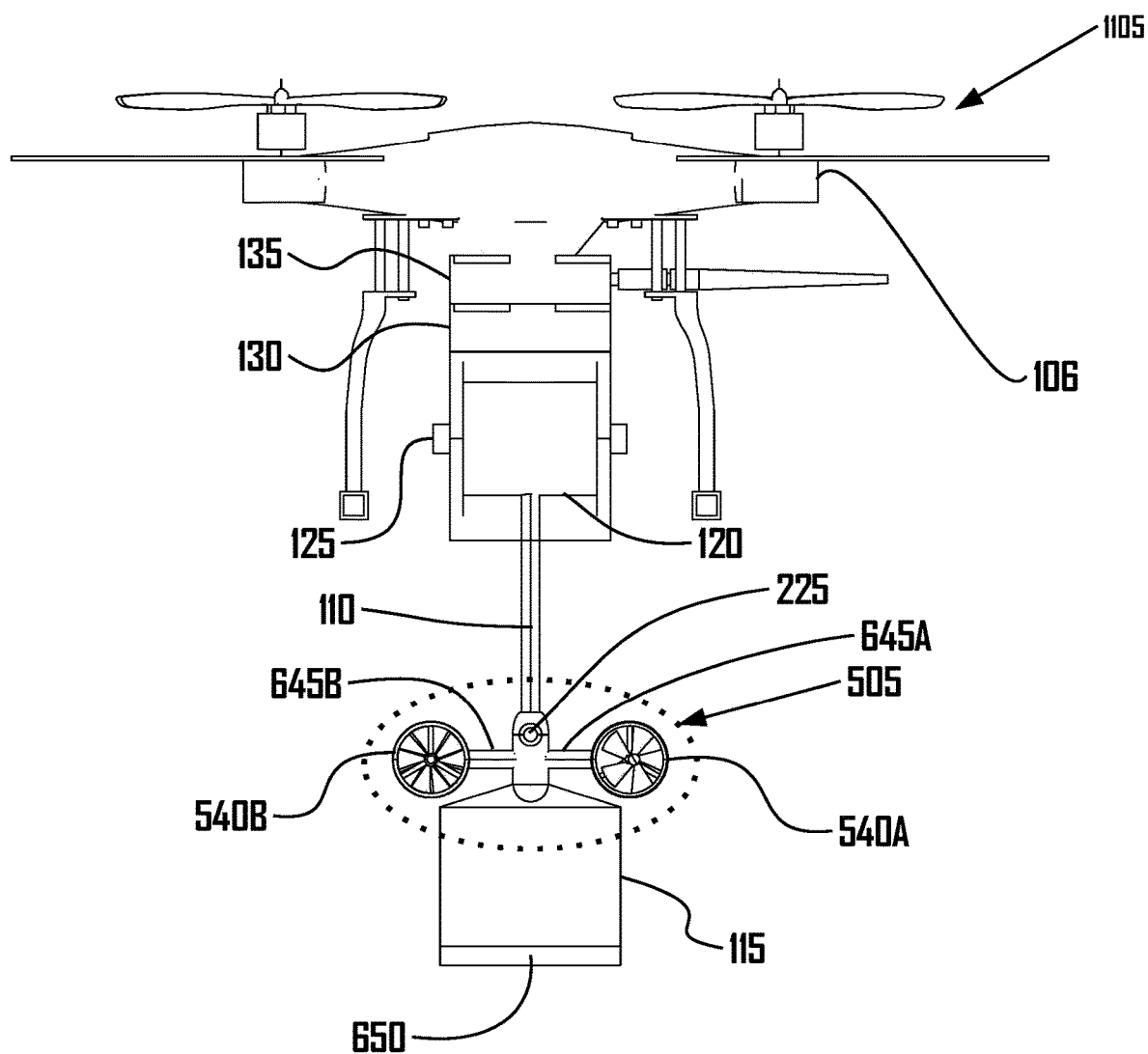
FIG. 6 is a front elevation parallel projection view of a first example of a drone carrying the load and the sensor enhanced control system ("SECS") of FIG. 5, in accordance with an embodiment.

FIG. 6 is a front elevation parallel projection view of drone 106 carrying load 115 and SECS with thrusters 505 of FIG. 5, in accordance with an embodiment. SECS with thrusters 505 may comprise, for example, arm 645A and arm 645B. Arms 645 may secure thrusters 540 to, for example, sensor suite and/or communications module 225 in or secured to load securement structure 230. Thruster 540A and thruster 540B are illustrated; a greater or lesser number of thrusters may be used. Thrusters 540 may be fans, propellers, EDF, hydrogen peroxide rockets, solid fuel rockets, and the like. Thrusters 540 may be rotated by motors, such as electric motors, combustion motors, and the like. Thrusters 540 may have a fixed orientation or may comprise a mechanism to adjust an orientation of thrusters 540. Thrusters 540 may be bi-directional (e.g. one fan which may be operated in either direction to produce force vectors in opposing directions) or may comprise two one-directional fans facing, for example, in opposite directions (which may be referred to herein as a "thruster unit"). Thrusters 540 may be activated individually or together, with the same or different power, to produce thrust vectoring or thrust vector control. For example, to produce clockwise yaw (when viewed from above), a thruster in a left side of SECS with thrusters 505 may be activated by itself or in conjunction with a thruster in a right side of SECS with thrusters 505. To produce left-ward lateral translation of SECS with thrusters 505, thrusters on a same side of thruster units may be activated. Simultaneous lateral translation and rotation may be produced or an SECS may be rotated to a desired orientation and thrust then applied by two or more thrusters to move the load laterally relative to the drone.

Rotational coupling 335 (illustrated and discussed in relation to FIG. 3) may allow thrusters 540 and load 115 to rotate without imparting a rotational force or torque on suspension cable 110 or drone 105, as discussed herein.

Battery 650 may provide power to thrusters 540 and/or to sensor suite and/or communications module 225 and/or load securement structure 230. As discussed in relation to FIG. 11, power may be provided by drone 106 via an electrical conduit in suspension cable 110.

Figure 7:
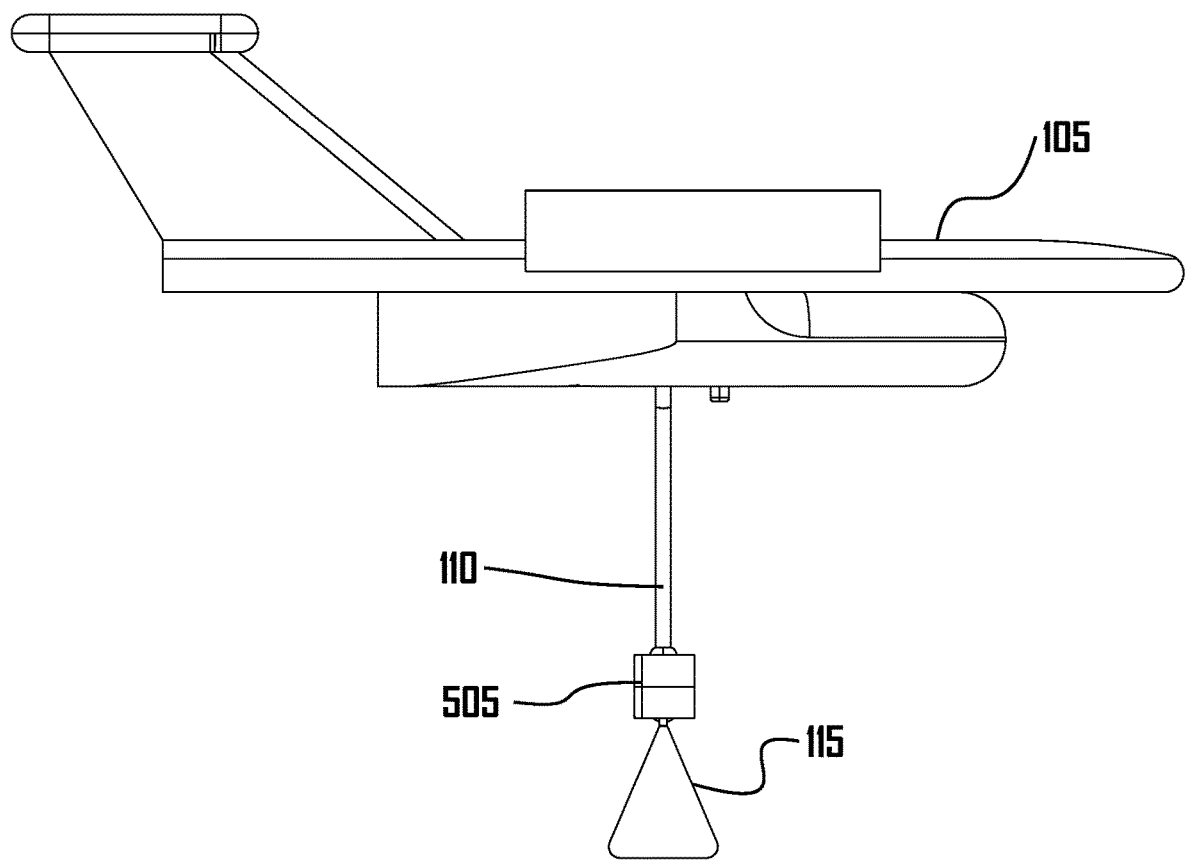
FIG. 7 is a side parallel projection view of a second example of a drone carrying the load and the sensor enhanced control system ("SECS") of FIG. 5, in accordance with an embodiment.

FIG. 7 is a side parallel projection view of drone 105 carrying load 115 and comprising SECS with thrusters 505 of FIG. 5, in accordance with an embodiment. Sensor suite and/or communications module 220 may obtain sensor data and/or may communicate with sensor suite and/or communications module 225 in or secured to load securement structure 230.

Figure 8:
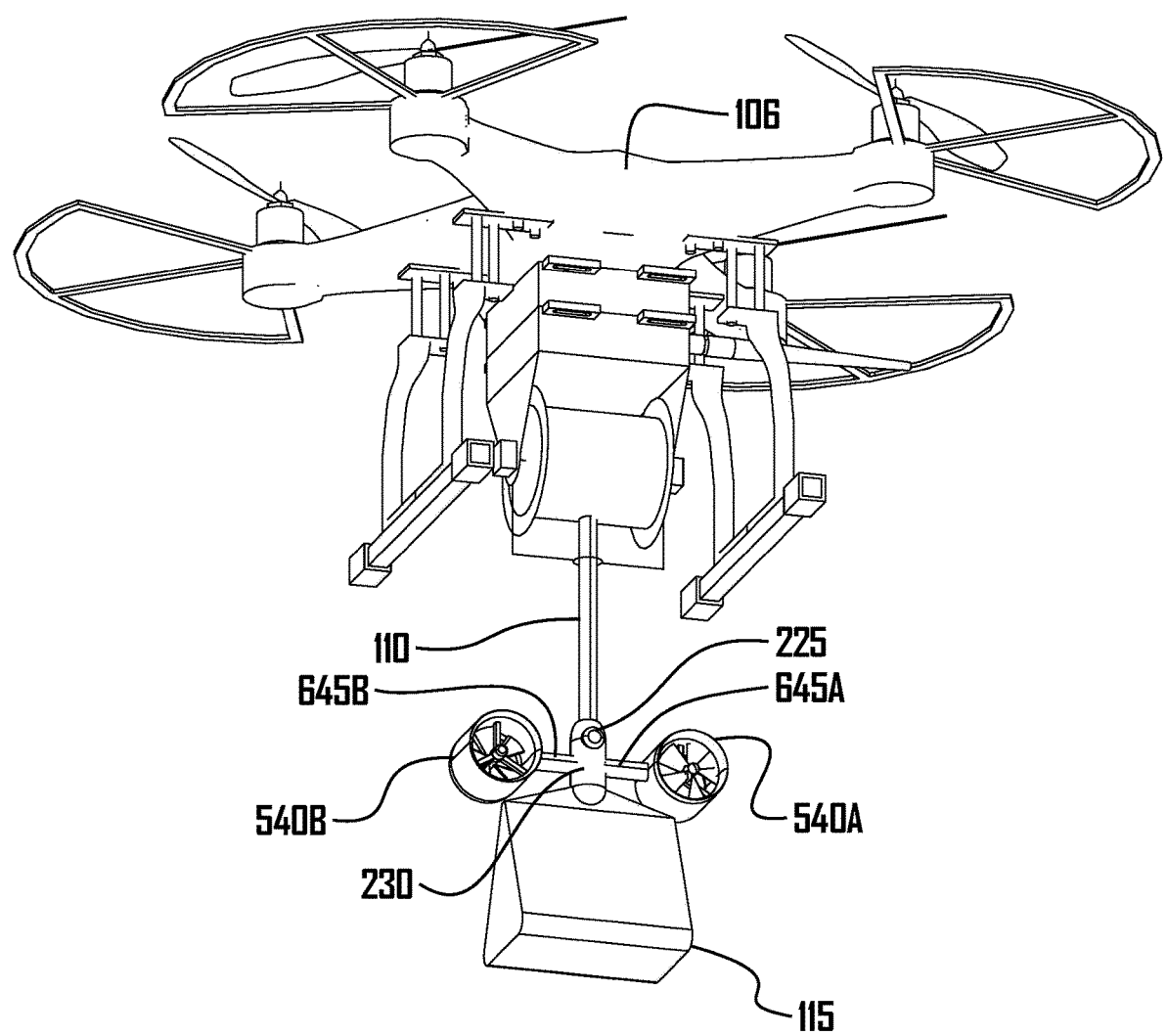
FIG. 8 is a bottom oblique parallel projection view of the second example of the drone carrying the load and the sensor enhanced control system ("SECS") of FIG. 5, in accordance with an embodiment.

FIG. 8 is a bottom oblique parallel projection view of a detail of drone 106 carrying load 115 and SECS comprising thrusters 540 and arms 645, in accordance with an embodiment.

Figure 9:
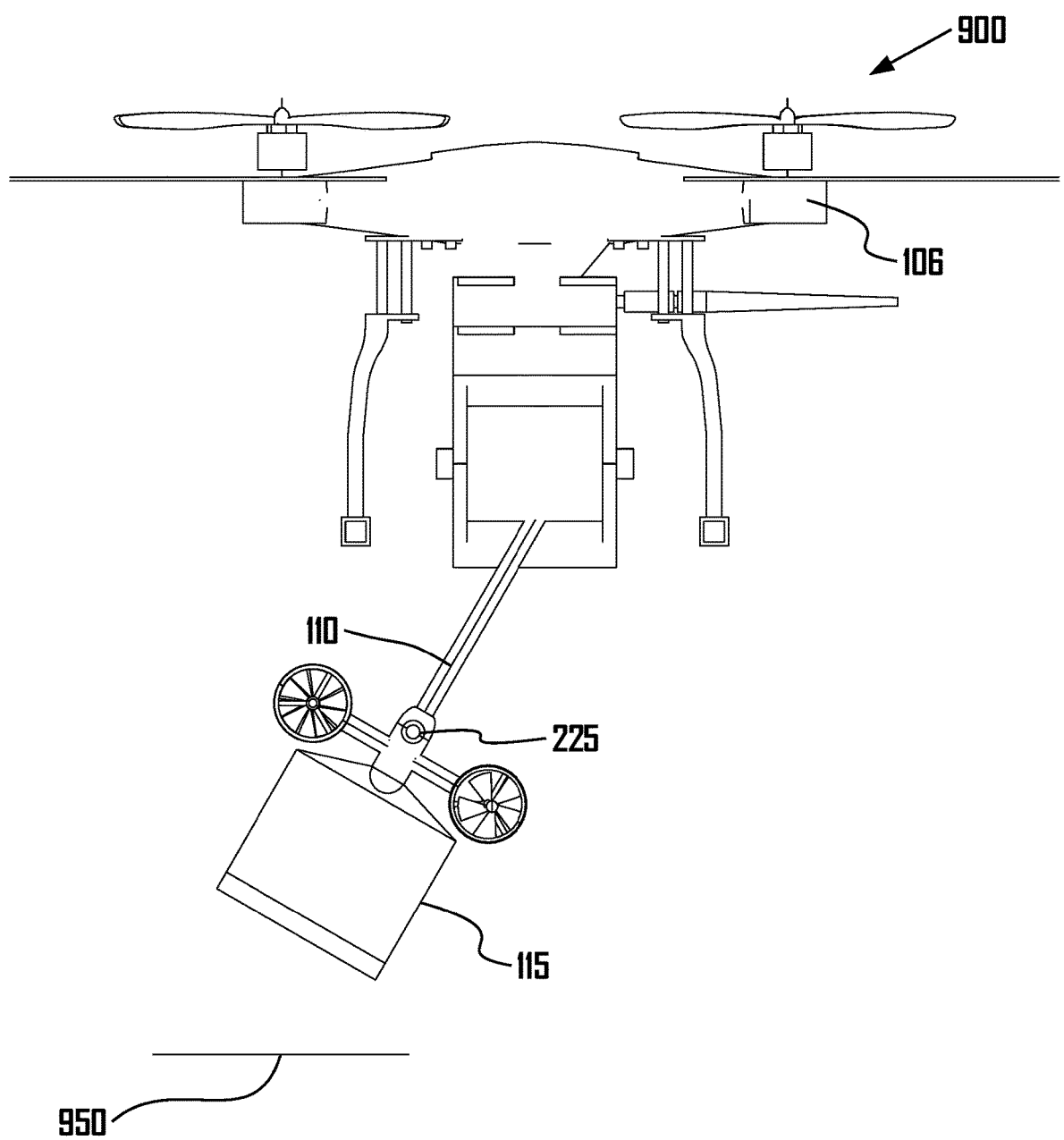
FIG. 9 is a front elevation parallel projection of a drone delivering a load to a target with the aid of an enhanced control system, in accordance with an embodiment.

FIG. 9 is a front elevation parallel projection of drone 105 delivering load 115 to target 950 with the aid of an enhanced control system, in accordance with an embodiment. In example 900, load 115 is at an angle relative to drone 105. This may be due to wind, relative and differential movement and/or acceleration of drone 105 and load 115, by pendular motion of load 115, by pendular motion of drone-load system 900 and the like. In order for navigation modules in drone 115 to navigate load 115 to target 950, navigation modules in drone 115, e.g. operational module 1400 or decision and control module 1500, may need to compensate for such movement. Sensor suite and/or communications module 225 and/or sensor suite and/or communications module 220 may communicate with processor executing, for example, operational module 1400 or decision and control module 1500, to allow drone 115 and/or navigation modules in drone 105, to understand that load 115 is at the angle relative to drone 105 and/or that load 115 is above target 950 notwithstanding that drone 105 is not. For example, these modules may instruct navigation modules in drone 105 to lower, notwithstanding that drone 105 is not immediately above target 950 though load 115 is. For example, these modules may have instructed navigation modules in drone 105 to compensate the angle between load 115 and drone 105 and may have instructed navigation modules in drone 105 to move to the location illustrated in FIG. 9, in which load 115 is above target 950. For example, these modules may instruct navigation modules in drone 105 to wait until load 115 assumes a lower angle relative to drone 105. For example, these modules may identify that load 115 and drone 105 have developed sympathetic motion or quasi-oscillatory motion, for example, due to transfer of momentum between load 115 and drone 105 and may instruct navigation modules in drone 105 to compensate for such sympathetic motion. For example, these modules may instruct hoist 120 to extend cable 110, to lower load 115 to target 950.

Figure 10:
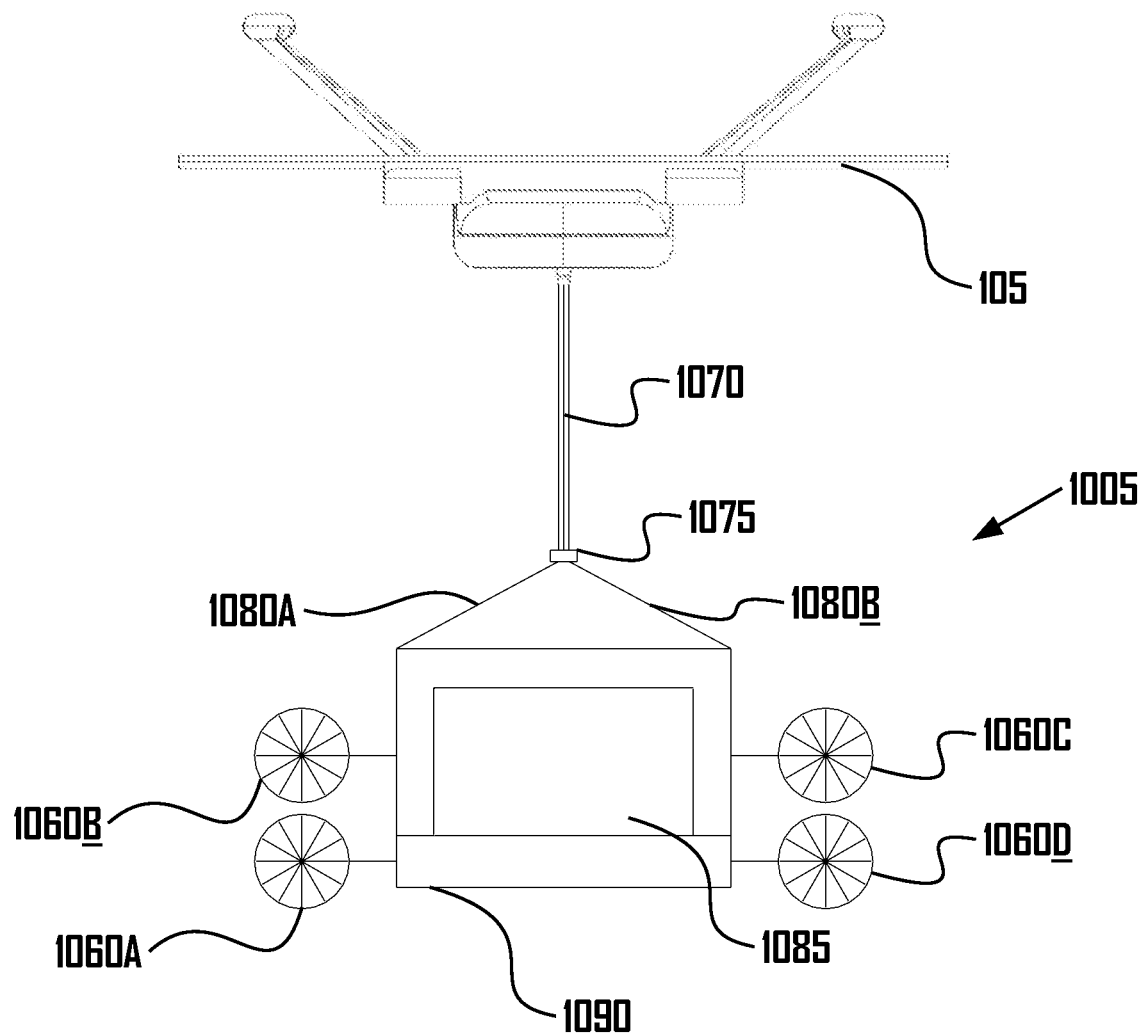
FIG. 10 is a front elevation parallel projection of a drone carrying a sensor enhanced control system ("SECS") integrated into a load container, in accordance with an embodiment.

FIG. 10 is a front elevation parallel projection of drone 105 and load thrusters integrated with load container 1005, in accordance with an embodiment. In this example, load thrusters integrated with load container 1005 comprises thrusters 1060. Thrusters 1060 may comprise thrusters, as discussed herein. Thruster 1060A and thruster 1060B are on a first side of SECS integrated with load container 1005, while thruster 1060C and thruster 1060D are on a second side of SECS integrated with load container 1005. One or more of thruster 1060 may be a bi-directional thrust assembly.

Thrusters 1060 may be activated individually or together, as with thrusters in SECS thruster apparatus 505.

Load bearing suspension cable connector 1080A and 1080B may connect load container 1005 to suspension cable 1070, including at rotational coupling 1075. Load 1085 may be within the load container 1005. Battery pack 1090 may provide power to thrusters 1060 and/or to computer processor and memory and other load control system logical components, such as load control system logical components 1301. In an embodiment, power may be provided by one or more batteries in drone 105 via power cable 1070 within, around, or next to the suspension cable.

Figure 11:
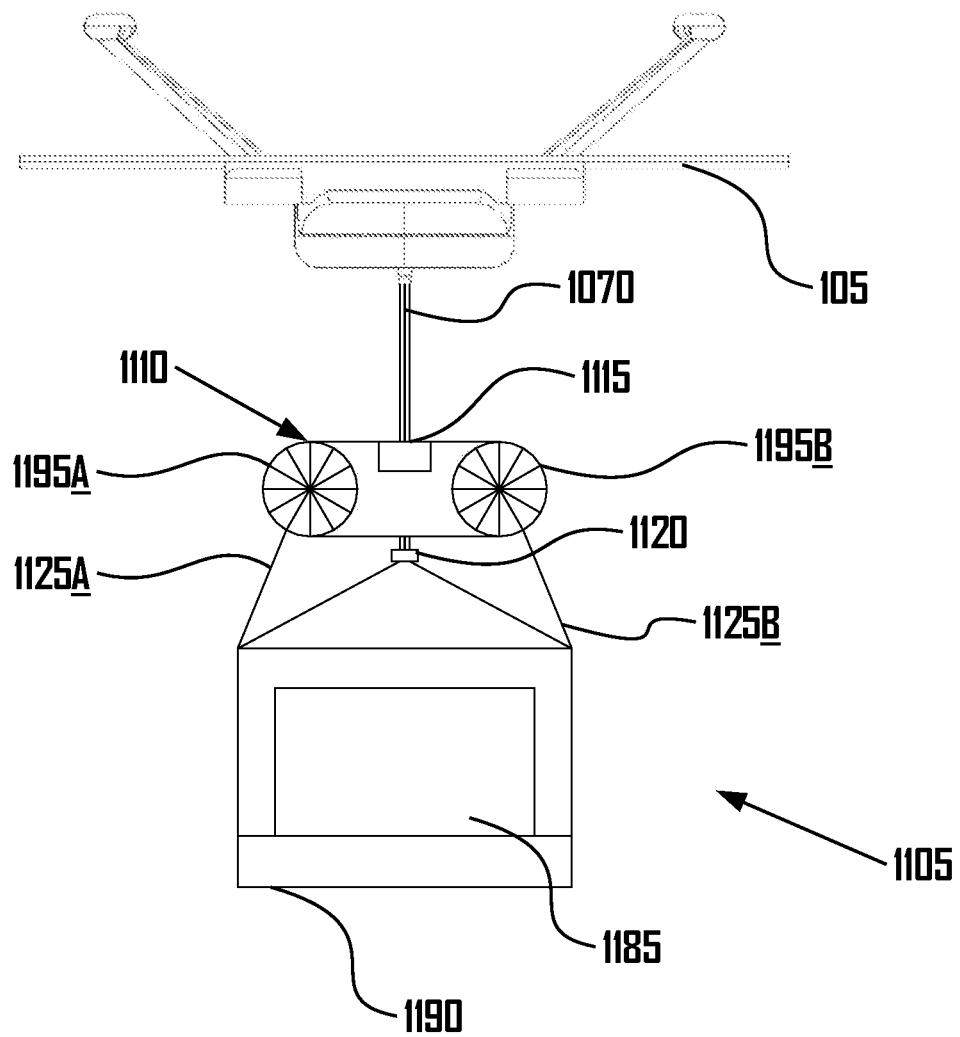
FIG. 11 is a front elevation parallel projection of a drone carrying a sensor enhanced control system ("SECS") integrated into a load container, in accordance with an embodiment.

FIG. 11 is a front elevation parallel projection of drone 105 carrying load thrusters 1110 separate from load container 1105, in accordance with an embodiment. Load thrusters 1110 separate from load container 1105 may be similar to load thrusters integrated into a load container 1005 illustrated in FIG. 10, though may comprise thrusters comprising bi-directional fans or bi-directional thrust units. E.g. thruster 1195A and thruster 1195B may each comprise one fan or propeller, wherein the fan or propeller may operate in either direction; in an embodiment, thruster 195 may comprise one motor and two fans in a bi-directional thrust assembly.

In addition, load thrusters 1110 separate from load container 1105 may comprise rotational load bearing 1115, which may allow SECS 1110 and load container 1105, secured thereto, to rotate separately from suspension cable 1070. Rotational load bearing 1120 may allow force from load container 1105 to be transferred to suspension cable 1070, bypassing load thrusters 1110 separate from load container 1105. In addition to or instead of load bearing suspension cable connector 1080A and 1080B, load thrusters 1110 separate from load container 1105 may be secured to load container 1105 by torque transmitting cable 1125A and 1125B. Torque transmitting cable 1125 may transmit torque of load thrusters 1110 separate from load container 1105 to load container 1105.

Figure 12:
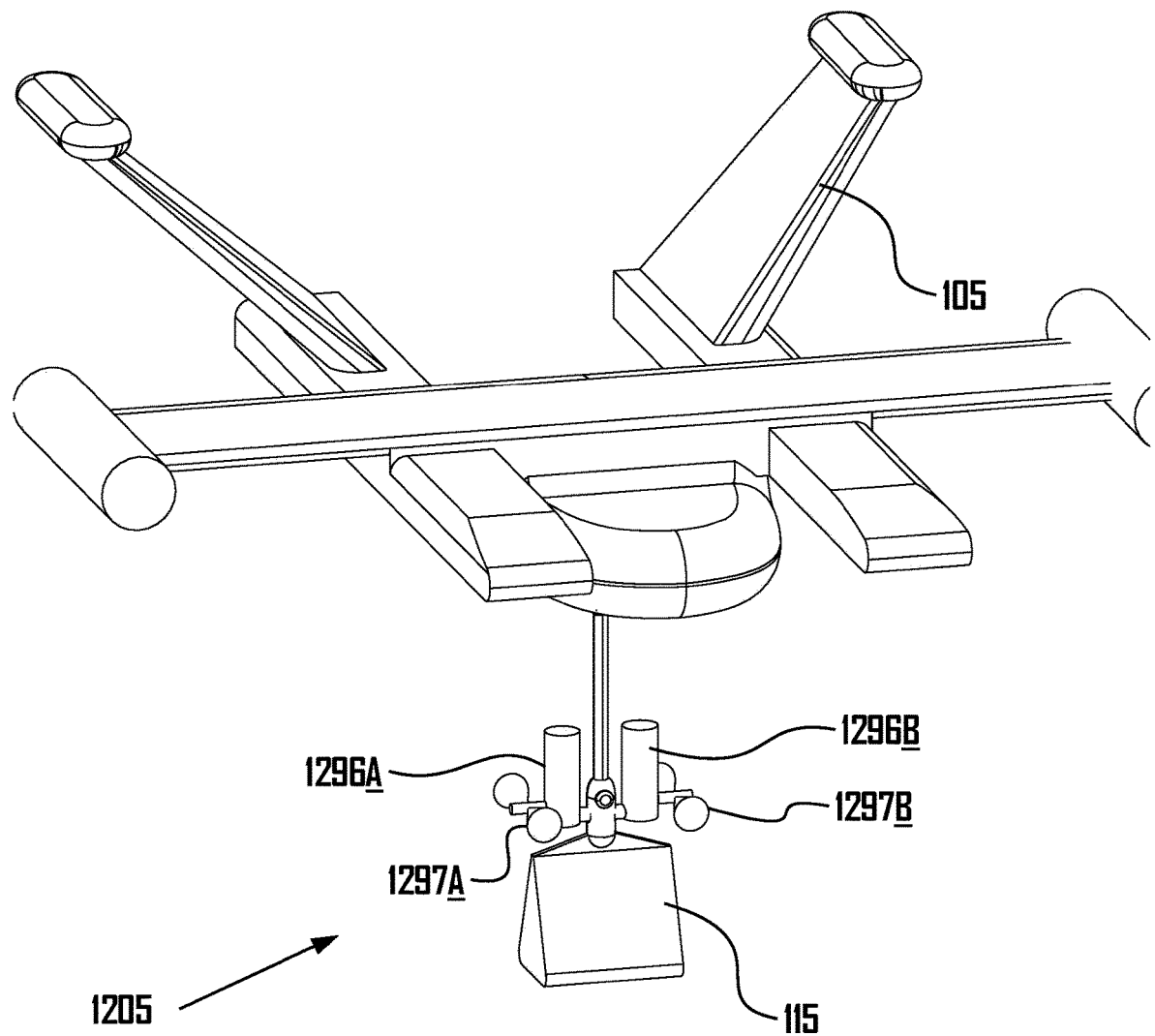
FIG. 12 is an isomorphic parallel projection of a drone carrying a sensor enhanced control system ("SECS") comprising compressed gas thrusters and a load, in accordance with an embodiment.

FIG. 12 is an isomorphic parallel projection of drone 105 with sensor enhanced control system ("SECS") 1205 and load 115, in accordance with an embodiment. SECS 1205 comprises compressed gas thrusters. Compressed gas thrusters may comprise vessel 1296A and vessel 1296B. Vessels 1296 may contain compressed gas, such as compressed air. In an embodiment, vessels 1296 may contain a propellant, such as hydrogen peroxide, which may react, burn, combust, including on contact with a catalyst, to produce a thrust fluid, such as water and oxygen. Thrust fluid may exit nozzle unit 1297A and/or nozzle unit 1297B and produce a thrust vector on SECS 1205. Exit nozzle units 1297 may comprise one or more exit nozzles; valves, including electronically controllable valves, may be activated to release thrust fluid through a desired exit nozzle and/or side of an exit nozzle unit, to produce opposing thrust vector(s).

Figure 13:
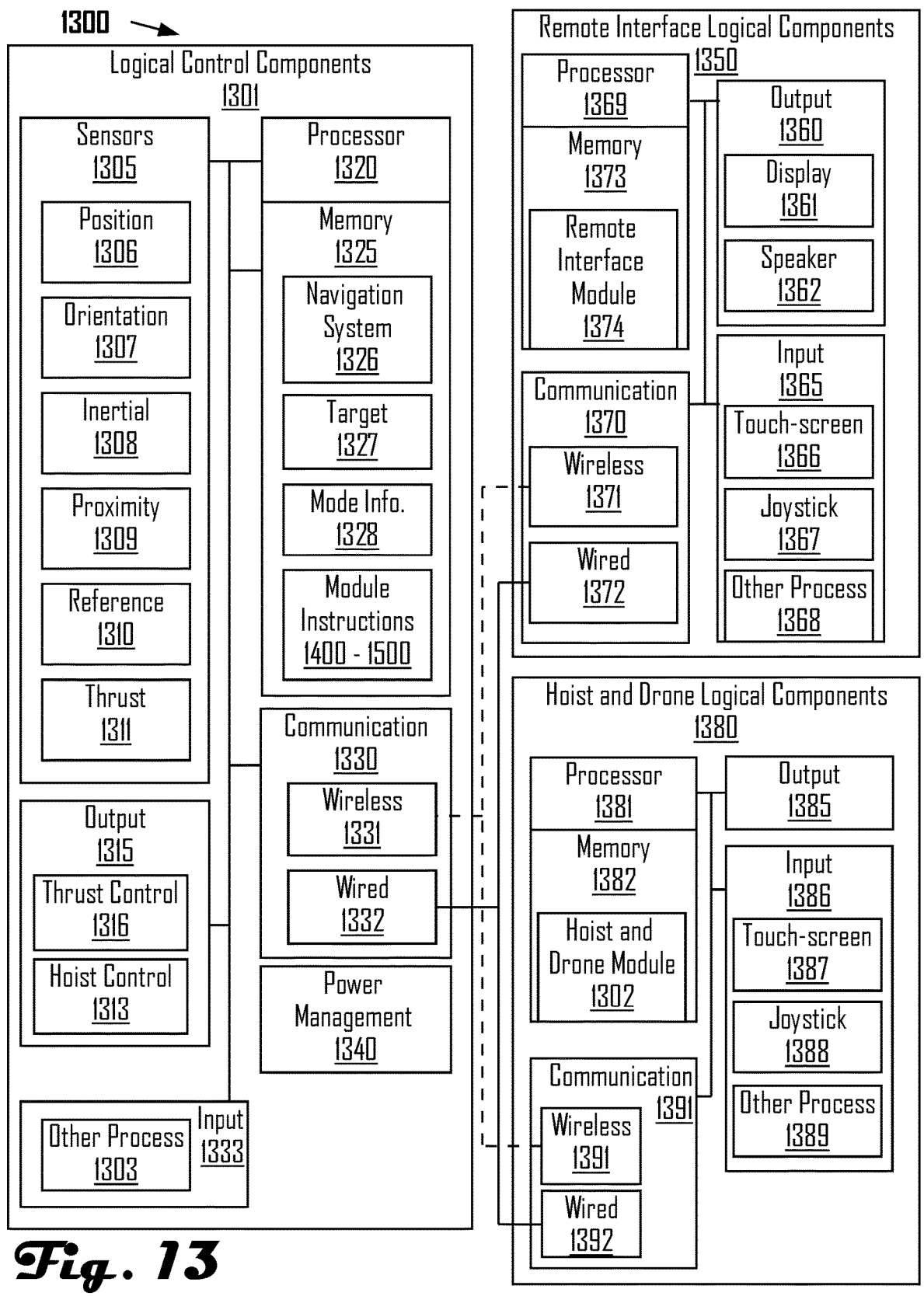
FIG. 13 schematically illustrates electrical, computer processor, memory, and logical control components of a suspended load control system or sensor enhanced control system and of a remote interface, in accordance with an embodiment.

FIG. 13 schematically illustrates electrical, computer processor, memory, and other logical control components of or making up a sensor enhanced control system ("SECS") 1300 including logical control components 1301, remote interface logical components 1350, and hoist and drone logical components 1380, in accordance with one embodiment.

Logical control components 1301 may be in, for example, a drone housing, in a thruster housing, such as in a housing for a load thruster, in a sensor housing, and the like. Logical control components 1301 and their housing may be separable from a drone, such as when a load sensor or load thruster are separable from the drone.

As illustrated in the embodiment in FIG. 13, within logical control components 1301 may be sensor suite 1305, processor 1320, memory 1325, communication system 1330, output 1315, input 1333, and power management 1340.

Sensor suite 1305 may comprise position sensors 1306, orientation sensors 1307, inertial sensors 1308, proximity sensors 1309, reference location sensors 1310, and thrust sensors 1011.

Processor 1320 may be one or more processor, microcontrollers, and or central processing units (CPUs). In some embodiments, processors and microcontrollers may be mounted to the same printed circuit board (PCB).

Memory 1325 may generally comprise a random-access memory ("RAM"), a read only memory ("ROM"), and a permanent non-transitory mass storage device, such as a disk drive or SDRAM (synchronous dynamic random-access memory).

Memory 1325 may store program code for modules and/or software routines, such as, for example, navigation system 1326 and module instructions, such as, for example, operational module 1400 and decision and control module 1500, as well as data or information used by modules and/or software routines, such as, for example, target data 1327, and mode or command state information 1328.

Memory 1325 may also store an operating system. These software components may be loaded from a non-transient computer readable storage medium into deployable equipment memory 1025 using a drive mechanism associated with a non-transient computer readable storage medium, such as a floppy disc, tape, DVD/CD-ROM drive, memory card, or other like storage medium. In some embodiments, software components may also or instead be loaded via a mechanism other than a drive mechanism and computer readable storage medium (e.g., via a network interface.

Memory 1325 may also comprise a kernel, kernel space, user space, user protected address space, and a datastore. As noted, memory 1325 may store one or more process or modules (i.e., executing software application(s)). Processes may be stored in user space. A process may include one or more other process. One or more process may execute generally in parallel, i.e., as a plurality of processes and/or a plurality of threads.

The kernel may be configured to provide an interface between user processes and circuitry associated with processor 1320. In other words, the kernel may be configured to manage access to processor 1320, a chipset, I/O ports, and peripheral devices by processes. The kernel may include one or more drivers configured to manage and/or communicate with elements of operational components of deployable equipment (i.e., processor 1320, chipsets, I/O ports, and peripheral devices).

Processor 1320 may also comprise or communicate via a bus and/or a network interface with memory 1325 or another datastore.

The data groups used by modules or routines in deployable equipment memory 1325 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar.

Communication system(s) 1330 may include wireless system(s) 1331 such as a wireless transceiver and wired system(s) 1332. Output 1315 includes thrust control 1316 via thruster controllers. Output 1015 includes hoist control 1313, to control a hoist. Power managing systems 1340 regulate and distribute the power supply from, e.g., batteries. One or more data connectors, data buses, and/or network interfaces may connect the various internal systems and logical components of the deployable equipment. Input 1333 may include commands conveyed through a touchscreen, a joystick, a keyboard, a microphone, a camera, one or more buttons, input from other processes 1303, or the like.

Aspects of the system can be embodied in a specialized or special purpose computing device or data processor that is specifically programmed, configured, or constructed to perform one or more of the computer-executable instructions explained in detail herein. Aspects of the system can also be practiced in distributed computing environments where tasks or modules are performed by remote processing devices that are linked through a communications network, such as a local area network (LAN), wide area network (WAN), the Internet, or any radio frequency communication technology. Data from deployable equipment may be of very low bandwidth and may not be restricted to a frequency or communication protocol. In a distributed computing environment, modules can be located in both local and remote memory storage devices.

Logical control components 1301 may work with a remote positional unit, remote interface, or target node ("remote interface unit") and logical components thereof, such as remote interface logical components 1350, and or with a hoist and drone logical components, such as hoist and drone logical components 1380, in accordance with one embodiment.

In embodiments, the remote interface unit may, for example, be held by an operator or attached to an object by magnets, bolts, or any other attachment mechanism. In embodiment, the remote interface unit may be dropped at a location on the ground or attached to, e.g., a life preserver or other flotational device, a rescuer, a load to be picked up, at a location for a load to be delivered, or an operational specific location. In embodiments, the remote interface unit may be provided by a mobile phone executing remote interface unit instructions.

In embodiments, remote interface logical components 1350 may convey input from an operator to logical control components 1301, such as command states and operational instructions to operational module 1400. In embodiments, remote interface logical components 1350 may convey information or data from hoist and drone logical components 1380 to logical control components 1301 and or to an operator, such as regarding a status of the drone, of the hoist, of a drone-load system, a length of suspension cable paid out, a force or mass on the hoist from the suspension cable, a center of mass of the drone-load system, a distance between a load and a target location, and the like.

Remote interface logical components 1350 may be in communication with logical control components 1301 and or with hoist and drone logical components 1380 via communication systems 1370, which may be wireless 1371 or wired 1372. Output 1360 from remote interface 1350 may include information displayed on a screen 1361, and audio 1362. Input 1365 to remote interface 1350 may include commands conveyed through touchscreen 1366, a joystick 1367, a microphone, a camera, one or more buttons, input from other processes 1368, or the like. In various embodiments, remote interface 1350 may comprise one or more physical and/or logical devices that collectively provide the functions described herein.

Remote interface logical components 1350 may further comprise processor 1369 and memory 1373, which may be similar to processor 1320 and memory 1325. Memory 1373 may comprise software or firmware code, instructions, or logic for one or more modules used by the remote positional unit, such as remote interface module 1374. For example, remote interface module 1374 may provide control and interface for a remote interface, such as to allow it to be turned on/off, to pair it with a drone, with a load, with hoist and drone logical components 1380, with logical control components 1301, to input instructions, or the like.

In embodiments, remote interface logical components 1350 may comprise a sensor suite or beacon configured to communicate, such as wirelessly, with logical control components 1301 and or hoist and drone logical components 1380 to provide, for example, a position reference. If the logical control components 1301 comprise what is considered a primary sensor suite and may be located at or proximate to a load, a secondary sensor suite location can be the drone, and a tertiary sensor suite location can be a location of interest for the load (e.g., a position to which or from which the load is to be obtained or delivered).

Also illustrated in FIG. 13 are hoist and drone logical components 1380. Hoist and drone logical components 1380 may comprise processor 1381 and memory 1382, which may be similar to processor 1320 and memory 1325. Memory 1382 may comprise software or firmware code, instructions, or logic for one or more modules used by a hoist and drone, such as a drone with a hoist and drone operational module 1302. For example, hoist and drone operational module 1302 may pair a drone and hoist with load thrusters, may output sensor data of the hoist and of the drone to logical control components 1301, and may receive and act on local and remote instructions, such as to retract or extend a suspension cable, to transport a load according to an functional mode or command state, or the like.

Hoist and drone logical components 1380 may be in communication with logical control components 1301 and or remote interface logical components 1350 via communication system 1391, which may comprise wireless 1391 or wired 1392 transceivers. Output 1385 from hoist and drone logical components 1380 may include information or data from, for example, hoist and drone sensors 1384, such as, for example, a cable length encoder, a reel torque encoder, a cable presence sensor (to sense the presence of a suspension cable in a hoist), stain gauges, equipment temperature sensors, power sensors, and the like. Output 1385 from hoist and drone logical components 1380 may further include information or data from, for example, thrusters of the drone, encoders of thrusters of the drone, power controllers of the drone (including batteries, electronic speed controllers, and the like), and the like. Input 1386 to hoist and drone logical components 1380 to control the hoist and drone may further comprise commands from other processes 1389, such as from logical control components 1301 and modules thereof, such as operational module 1400 and decision and control module 1500. Input 1386 to hoist and drone logical components 1380 to control the hoist and drone may come from other processes 1389, such as from remote interface logical components 1350, logical control component 1301, and from human operators, which commands may be conveyed through, for example, such as touchscreen 1387, joystick 1388, a microphone, a camera, one or more buttons, or the like.

Figure 14:
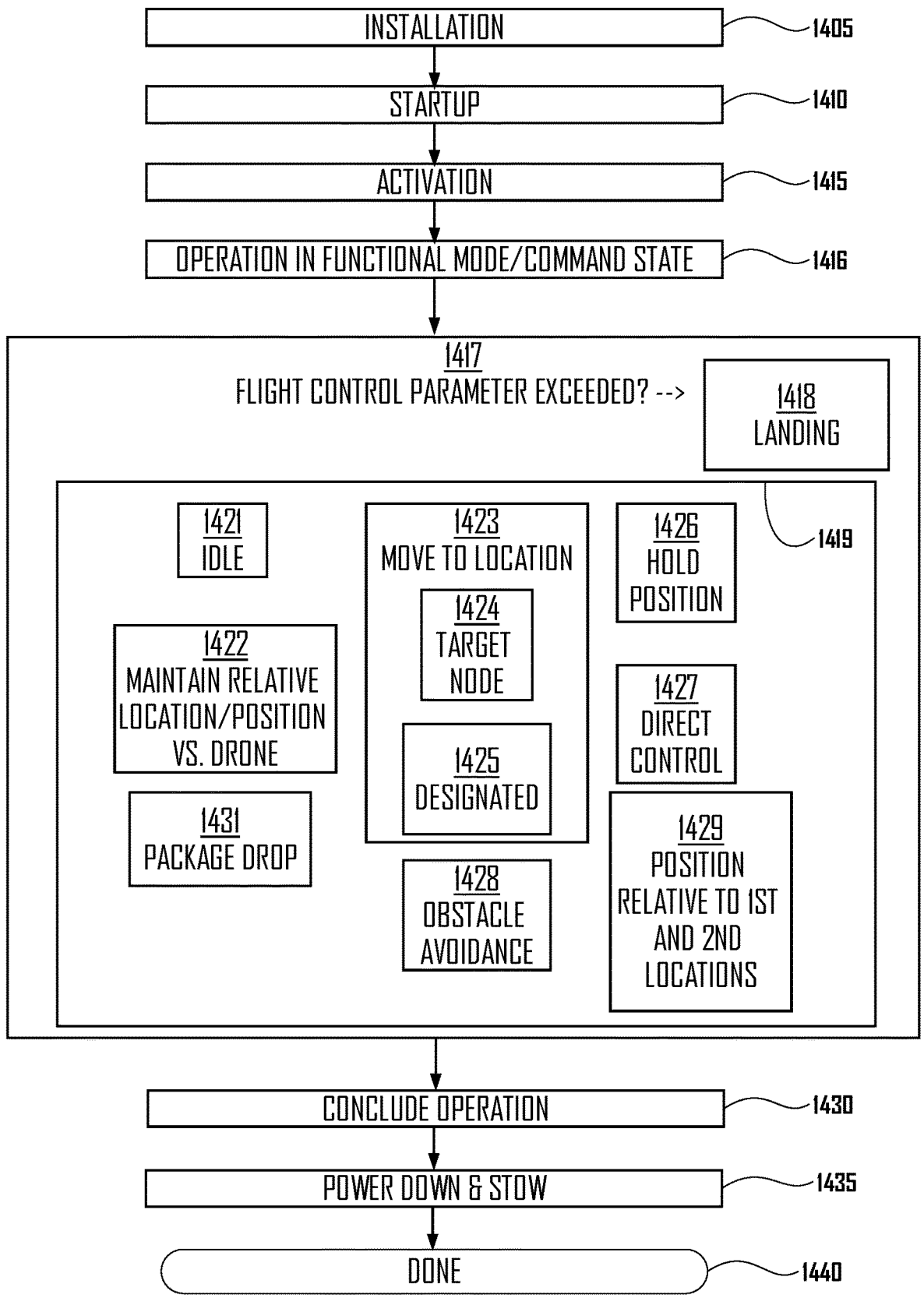
FIG. 14 illustrates an operational module of a suspended load control system or sensor enhanced control system including multiple modes or command states in accordance with an embodiment.

FIG. 14 illustrates operational module 1400 of an SECS, in accordance with one embodiment. Instructions of, or which embody, operational module 1400 may be stored in, for example, memory 1325, and may be executed or performed by, for example, processor 1320, as well as by electrical circuits, firmware, and other computer and logical hardware of an SECS with which operational module 1400 may interact.

In block 1405, if not already present in a drone and/or suspension cable, hardware embodying the SECS may be deployed onto a suspension cable from which a load may be suspended. In embodiments, an SECS need not be powered on for deployment.

In block 1410, the SECS may be started up. In some embodiments, the system can be initialized by the press of a button located on or remote from the SECS. Near the external button that can initialize the system, another button may be present that allows for immediate system shut down when pressed. In addition to the initialization interface, operational module 1400 may also be initialized by an operator or process not directly next to the system.

In block 1415, operational module 1400 may be activated.

In block 1416, a functional mode or command state may be initiated, such as according to a selection by an operator or by another process.

In block 1417, which may iterate continuously during operation, including on or before take-off, operational module 1400 may determine whether a flight control parameter of the drone-load system is not exceeded. For example, a system model, further discussed in relation to 1500, may comprise parameters a mass of the drone, a mass of the load, a length between the drone and the load, an inertia of the load, an inertia of the drone, a center of mass of the drone-load system, an impulse force of the load thruster, an impulse force of the drone thruster, a rotational motion of the load, a rotational motion of the drone, a pendular motion of the load, a pendular motion of the drone, a movement of the load over time through an absolute coordinate space, and a movement of the drone over time through the absolute coordinate space. One or more of such system model parameters, or a combination thereof, may be evaluated as a flight control parameter. One or more of such flight control parameters may be evaluated in conjunction with information such as a location of a target, available power to the drone, weather information, and the like, to determine whether the flight control parameter will be exceeded with respect to a then-current objective. For example, if a center of mass of a drone-load system is too far to one side or if a mass of a load, measured in terms of response to the drone-load system to force from thrusters, is too great, an impulse force of a drone thruster may not be sufficient to maneuver the drone-load system.

If affirmative or equivalent at block 1417, at block 1418 operational module 1400 may perform a landing, including an emergency landing. A landing may comprise a descent to a nearest, most open, least populated area.

In block 1420 and a functional mode or command state, operational module 1400 may perform or call suspended load control decision and control module 1500 as a subroutine or submodule, to implement a functional mode or command state. The functional modes or command states of the system are:

Idle mode 1421: all internal systems of the SECS are operating (e.g., the SECS observes its motion and calculates corrective action), but the load thrusters or instructions to the or drone thrusters are shut off or maintain existing speed only, without action to affect motion of a load.

Maintain relative position vs. ownship module 1422: The load is stabilized with respect to a slung origin point. For example, when the SECS with load thrusters is suspended with a load below a drone, maintain relative position vs ownership module 1422 will cause the load thrusters of the SECS to keep the load directly below the drone. Maintain relative position vs ownership module 1422 localizes the drone motion and performs the corrective actions necessary with the thrusters to critically damp any other suspended load motion. If the drone is traveling at a low speed, the SECS with thrusters will couple its velocity with the drone so the two entities move in unison. Upon a disturbance to the load, maintain relative position vs drone module 1422 provides thrust in the direction of the disturbance to counteract the disturbance, eliminating the swing. If the SECS does not have thrusters, ("SECS"), maintain relative position vs ownership module 1422 will interact with the control or navigation module of the drone to counteract or dampen differences between motion of the load and motion of the drone. For example, if the drone and load have developed sympathetic motion relative to one another, such as pendular motion in one or both objects, which pendular motion is offset, maintain relative position vs ownership module 1422 may cause the drone to move in a manner which dampens or reduces such differences in motion.

Move to/stop at position module 1423: In an SECS without load thrusters, move to/stop at position module 1423 will interact with the drone thrusters to stabilize the drone and load to a fixed position, counteracting the influence of the weather or transfer of momentum with the load. This mode has the effect of killing all motion. In an SECS with load thrusters, move to/stop at position module 1423 will activate load thrusters and/or the drone thrusters to stabilize the load and drone to a fixed position, counteracting the influence of the weather or transfer of momentum with the load. This mode has the effect of killing all motion. In either case, an operator or other process can send the desired target position to move to/stop at position module 1423 via, for example, the remote interface 1350. This can be accomplished in at least two ways:

Target node position module 1424: The operator or a recipient of a package can place a remote positional unit or target node 1310 at the desired target location (e.g., target 950 of FIG. 9). The target node or reference 1310 will communicate wirelessly with target node position module 1424 to indicate the desired position or target, and target node position module 1424 responds by maneuvering the drone and/or an SECS with load thrusters to the desired location. A remote interface 1350 UI may receive and display the location information of both entities.

Designated position module 1425: An operator or another process can use a remote interface 1350 to send a designated position (e.g., latitude and longitude coordinates) as a commanded location to designated position module 1425. Designated position module 1425 will then steadily direct the drone and SECS to the desired position. Designated position module 1425 may simultaneously send feedback to the remote interface 1350 regarding position and distance information.

Hold position module 1426: may resist all motion and attempt to maintain a current position of the drone, notwithstanding or in response to external forces, such as weather and motion of the load. If in an SECS with load thrusters, hold position module 1426 may resist all motion and attempt to maintain a current position of the load and or the drone, notwithstanding or in response to external forces, such as weather, independent of the drone's motion. This module has the effect of dampening all motion of the drone or load. This mode has conditional responses relative respectively to drone speed, safety factors, and physical constraints.

Direct control module 1427: Joystick or external process instructed operation of the drone in three degrees of freedom. The operator or an external process is able to directly control positioning, rotation, and thruster output level of either the drone or of load thrusters, with control systems augmented by decision and control module 1500. Though the SECS is entirely closed-loop and does not require external control during operation, there is an option for user or external process control.

Obstacle avoidance mode 1428: identifies a path of the drone-load system, identifies objects in the path, determines position, rotation, thruster output level, and suspension cable length which may avoid the obstacle, and outputs instructions to thrusters and or hoist to avoid the obstacle. For example, obstacle avoidance module 1428 module may receive and process sensor information such as to i) to equalize the distance between sensor locations, such as at fan units and objects, such as obstacles, sensed in the environment or ii) to measure or receive geometry of a load, measure geometry of obstacles sensed in the environment, determine, or receive the position, orientation, and motion of the load, and negotiate the load relative to the obstacle.

Position relative to first and second locations mode 1429: An operator or process can use, for example, remote interface logical components 1350 to designate a first position (e.g., pickup or drop off location); the operator or process may further designate a second location, such as a location of a drone, a location on the ground, etc., and may also designate a desired a rate of change between the first and second locations. Thrusters and hoist are activated to stabilize the drone relative to the first location and then activates hoist and load thrusters to move the load from the first location to the second location. The rate of change may be based on percentage of a maximum rate of change actuators can safely achieve. This mode may further hold a desired tension on a suspension cable.

Package drop 1431: The drone and SECS picks up, transports, and delivers a load, such as a package, to a destination. This may include activation of actuators to release a package, obtaining images of the release location, obtaining other authentication or authorization for the delivery, and the like.

In block 1430, the drone completes its operation and the drone may return to a charging location, dispatch center, or the like.

In block 1435, if the drone comprises collapsible components or components which may be removed, such as thrusters on propulsion arms or a load carrying structure, they may be folded up, released, or other removeable components may be removed. The drone may be stowed in a charger or any convenient location.

At done block 1499, if not performed at block 1435, operational module 1400 may be shut down.

Figure 15:
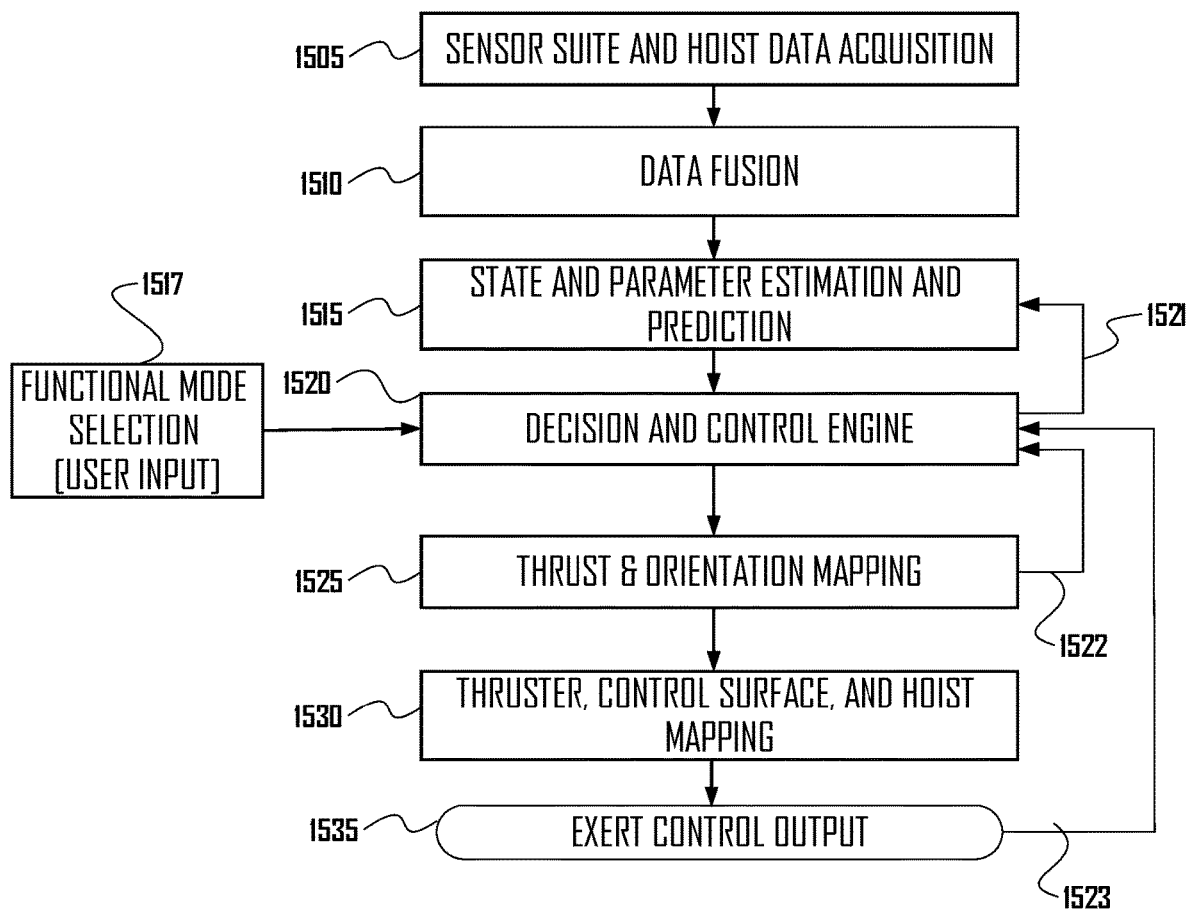
FIG. 15 illustrates a suspended load control decision and control module of a suspended load control system or sensor enhanced control system in accordance with an embodiment.

FIG. 15 illustrates decision and control module 1500 of an SECS in accordance with one embodiment. Instructions of, or which embody, decision and control module 1500 may be stored in, for example, memory 1325, and may be executed or performed by, for example, processor 1320, as well as by electrical circuits, firmware, and other computer and logical hardware with which decision and control module 1500 may interact.

Decision and control module 1500 may operate in a closed loop to understand its position and motion in near real time, determine a most desired system response, and send desired response(s) to load thrusters or drone thrusters to control the load or enhance control of the drone during operations. This process may be continuous as long as the system is powered.

At block 1505, decision and control module 1500 may obtain sensor data from, for example, sensors 1305, such as accelerometer, gyroscope, magnetometer, GPS, lidar/radar, machine vision, and/or range finders. Sensor data may comprise image data, accelerometer data, gyroscope data, magnetometer data, light detection and ranging ("LIDAR") data, and, if available, global positioning system ("GPS") data. Image data may comprise object detection, such as detection of load, of an SECS, of a drone, as well as components of such an object, such as identification of an arm of a drone, a hoist, a fan unit, or the like. Image data and object detection may also comprise identification of optical flow of such images or pixels in successive frames. Accelerometer data may comprise 3-degree of freedom ("3 DoF") acceleration data in a sensor coordinate frame. Gyroscope data may comprise 3 DoF angular acceleration data in the sensor coordinate frame. Magnetometer data may comprise 3 Degree of Freedom ("DoF") magnetic field data in the sensor coordinate frame. LIDAR data may comprise point, sweep, rotating, radial, distance, and/or linear data which measures distance and/or angle relative to objects, the ground, and/or water.

At block 1510, the decision and control module 1500 combines data from the sensors to obtain a data fusion describing position, orientation, motion, and environment of the drone-load system.

Sensor data is fused and filtered by decision and control module 1500 through non-linear flavors of a Kalman Filter to yield an accurate representation of the system's state. Closed-loop control methods including fuzzy-tuned proportional, integral, and derivative feedback controllers have bidirectional communication with advanced control methods including deep learning neural nets and future propagated Kalman filters, allowing for further real-time system identification.

At block 1515, decision and control module 1500 performs state estimation using non-linear state estimators to project near-term future motion based on the data fusion and on feedback from the decision and control engine to the state estimator. In this block decision and control module 1500 may feed a system model and its past estimated or initialization state to a data fusion disturbance estimate model, such as into a system model in an unscented Kalman Filter ("UKF"), to be fused with then-current sensor data. As noted, the UKF and system model may include, and may therefore determine as an estimated state, one or more of a mass of a drone, a mass of load and SECS, a cable length, an inertia of the drone, an inertia of load and SECS, a fan and actuation or impulse force of the drone, a fan and actuation force or impulse force of load thrusters, rotational motion of the drone, rotational motion of the load, pendular motion of the drone, pendular motion of load thrusters or load, movement of a drone over time through an absolute coordinate space, and movement of a load over time through an absolute coordinate space.

At block 1520, decision and control module 1500 takes state estimation 1515, informed by the user-selected functional mode or command state 1520, as well as additional feedback from the thrust and orientation mapping 1530 and output control 1540, and decides how the drone-load system should move or exert force.

Algorithmic output is sent to motion or power controllers, such as ESCs, which will send the desired thrust response to the thrusters and hoist via, for example phase control of pulse modulated power signals. The net thrust output is mapped in real-time through encoders and load cells then sent back to decision and control block 1520 and onward for closed-loop control.

At block 1525, decision and control module 1500 maps desired orientation with thrust vectors from thrusters to generate a thrust and orientation mapping to achieve the determined thrust and orientation of the SECS apparatus.

At block 1530, decision and control module 1500 maps the thrust and orientation mapping to thrusters, thruster thrust vectors, the hoist, and control surfaces and generates a fan, hoist, and control surface mapping to control thrusters, the hoist, and control surfaces to achieve the desired thrust, orientation, and spacing of the drone and load.

At block 1535, decision and control module 1500 applies the fan, hoist, and control surface mapping to output power control signals to actuators such as the thrusters, hoist, and control surfaces (or electronic components controlling the same) of the drone to achieve the determined thrust and orientation, exerting commanded control output and implementing a dynamic response.

In embodiments, a determination to move a load to a desired location may first result in re-orientation or rotation of the load and or drone with respect to the desired location and then thrust to propel the load toward the desired location.

At done block 1599, decision and control module 1500 may conclude or return to a module which may have called it.

Figure 16:
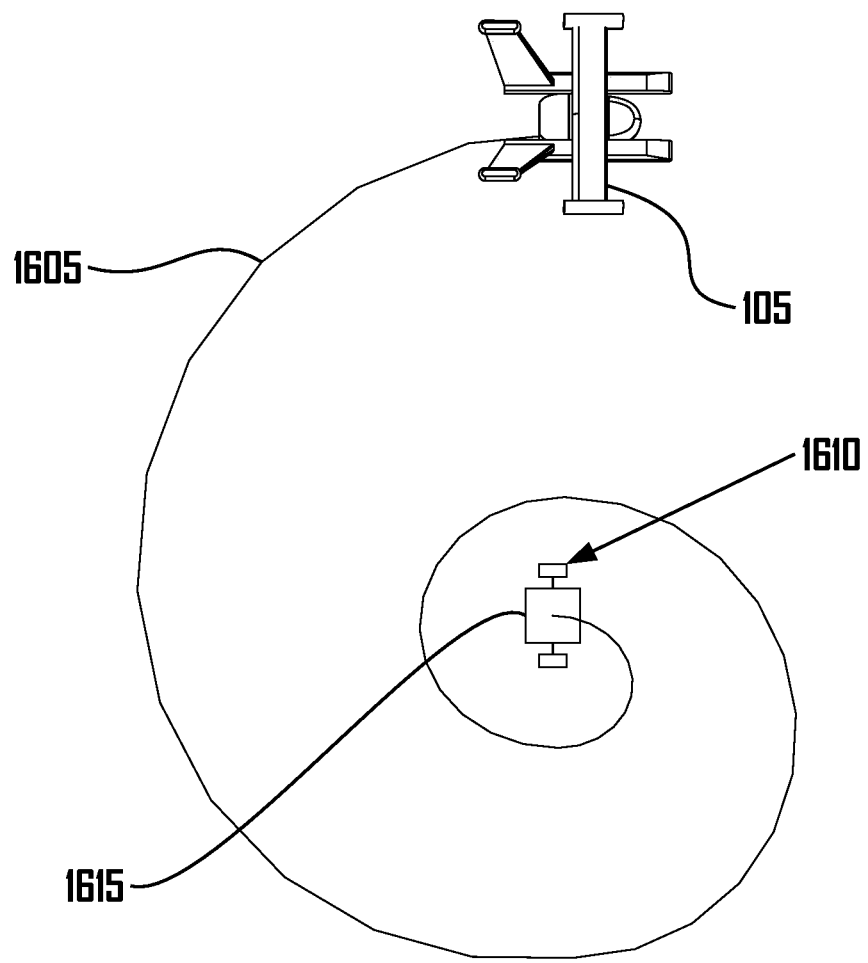
FIG. 16 is a top oblique perspective illustration of a long line operation performed by a drone and a sensor enhanced control system ("SECS").

FIG. 16 is a top oblique perspective illustration of a long line operation performed by drone 105 and an SECS. Suspension line 1605 extends from a hoist in drone 105. Load thrusters, a sensor suite, and communications modules 1610 ("remote SECS components") and or suspension line 1605 are secured to load 1615, which may be beneath the remote SECS components 1610. Drone 105 may orbit a target location, with suspension line 1605 contouring a gravity well, and load 1615 generally at the target location. To precisely position and orient load 1615 relative to the target location, the SECS in or of drone 105 may output thrust from load thrusters. The SECS of drone 105 may further control a hoist of drone 105 to control a tension on suspension line 1605 and an elevation of remote SECS components 1610. The SECS of drone 105 may further control thrusters of drone 105 to maintain the orbit or, for example, to transition to transporting load 1615 to another location. Position relative to first and second locations mode 1429 may be used in such an operation.

FIG. 17 is a front elevation parallel projection of drone 106 comprising an SECS and carrying load 1705, forming drone-load system 1700, in accordance with an embodiment. In this embodiment, load 1705 is not carried on a suspension cable or may be secured by a suspension cable which is short; in this embodiment, load 1705 is secured by or between legs 1710 of drone 106. This figure illustrates that load 1705 may have a non-uniform density and that drone 106 and its SECS may, as discussed herein, determine a system state of the drone-load system 1700, including a center of mass of drone-load system 1700, may determine if a flight control of drone-load system 1700 in the system state is exceeded, may instruct actuators of drone-load system 1700 to transport load 1705 to a destination, automatically compensating for states of drone-load system 1700, may deliver load 1705, may resume flight of drone 106 without load 1705, and may automatically re-calculating the system state and actuator control parameters to achieve the then-current objective.

Aspects of the system can be embodied in a specialized or special purpose computing device or data processor that is specifically programmed, configured, or constructed to perform one or more of the computer-executable instructions explained in detail herein. Aspects of the system can also be practiced in distributed computing environments where tasks or modules are performed by remote processing devices that are linked through a communications network, such as a local area network (LAN), wide area network (WAN), or the Internet. In a distributed computing environment, modules can be located in both local and remote memory storage devices.

In some embodiments, the remote positional unit or target node may be a mobile phone or may be a special purpose device made of durable polymer or plastic and may be, e.g., large enough to fit into a hand. The remote positional unit or target node may have an external antenna. The remote positional unit or target node may be secured to a location by magnets, bolts, or any other securement. The remote positional unit or target node may be dropped to a location on the ground or secured to, e.g., a life preserver or other flotational device, a rescuer, a load to be picked up, a location for a load to be delivered, or an operational specific location. The remote position unit or target node may be brought to the location, activated to identify the location, and then may be removed from the location.

The entire process is unmanned and automated aside from the high-level operator-selected or process-selected functional control modes. The net output is a control force to stabilize a suspended load or to enhance control of a drone carrying a load.

Status indicator lights may be mounted on various surfaces of a drone to aid in visibility and operation of the drone from above and below. For example, a drone may have external lighting such as LEDs near the load thrusters as well as drone thrusters that identify the edges and orientation of drone and load. This may allow for improved identification in hard viewing situations such as inclement weather. During operation, the LED display indicators may show that the drone-load system is active and may convey useful information.

Covers may contain and protect computer hardware, such as a computer processor and memory, a power supply, electronic speed controllers, microcontrollers, sensors, and the like, such as load control system logical components 1301 and hoist and drone logical components 1380. A power supply may be a single power brick or an array of battery cells wired in series and/or in parallel, such as lithium-polymer (LiPo) cells. Batteries may be removable for inspection and/or to swap discharged and charged batteries. Batteries may be charged while installed in drone (i.e., without having to remove them) via nodes or a wireless charging system). Batteries may include auxiliary battery(ies) to supply a steady supply of power to a processor even if thrusters draw a relatively large amount of power from main batteries. In embodiments, a drone can provide power through a line extending down the suspension cable to load thrusters, sensors, and the like. In embodiments, the drone can provide some power to equipment, while the equipment may obtain additional power from an on-board power supply.

A drone and components discussed herein may be formed of any suitable material such as metals, plastic, and composite materials, such as fiber reinforced resin. A drone may allow access into internal space via a sealed hatch or one or more removable panels or components, allowing for maintenance and inspection.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

Following are non-limiting examples.

Example 1. A control system for a drone-load system to influence at least one of a position, orientation, or motion of the drone-load system, comprising: the drone-load system, wherein the drone-load system comprises a drone and a load, wherein the drone comprises a drone thruster and wherein the load is secured to the drone; a sensor suite, and a computer processor and memory, wherein the memory comprises a control module which, when executed by the computer processor, is to determine at least one of a position, orientation, or motion of the drone-load system based on a sensor data from the sensor suite and is to control the drone thruster to influence at least one of the position, orientation, or motion of the drone-load system.

Example 2. The control system according to Example 1 or another example herein, wherein the load is secured to the drone by a suspension cable and further comprising a load thruster secured proximate to the load at a terminal end of the suspension cable and wherein the control module is further to control the drone thruster and the load thruster to influence at least one of the position, orientation, or motion of the drone-load system.

Example 3. The control system according to Example 1 or another example herein, wherein the load is secured to the drone by a suspension cable and further comprising a hoist for the suspension cable and wherein the control module is further to control the hoist to influence at least one of the position, orientation, or motion of the drone-load system.

Example 4. The control system according to Example 1 or another example herein, wherein to determine at least one of the position, orientation, or motion of the drone-load system based on a sensor data from the sensor suite comprises to estimate or predict a state or parameter of the drone-load system based on the sensor data.

Example 5. The control system according to Example 4 or another example herein, wherein to estimate or predict the state or parameter of the drone-load system based on the sensor data comprises to combine the sensor data from the sensor suite in a non-linear filter according to a system model with feedback from at least one of a functional mode or command state of the control module, a thrust and orientation mapping, or a fan and hoist mapping.

Example 6. The control system according to Example 5 or another example herein, wherein the system model comprises a mass of the drone, a mass of the load, a length between the drone and the load, an inertia of the load, an inertia of the drone, a center of mass of the drone-load system, an impulse force of the load thruster, an impulse force of the drone thruster, a rotational motion of the load, a rotational motion of the drone, a pendular motion of the load, a pendular motion of the drone, a movement of the load over time through an absolute coordinate space, and a movement of the drone over time through the absolute coordinate space.

Example 7. The control system according to Example 4 or another example herein, wherein the control module is further to determine that a flight control parameter of the drone-load system is not exceeded by the state or parameter of the drone-load system.

Example 8. The control system according to Example 7 or another example herein, wherein the flight control parameter of the drone-load system comprises at least one of a center of mass of the drone-load system relative to a maneuvering requirement or a mass of the drone-load system relative to an impulse force and battery capacity of the drone thruster.

Example 9. The control system according to Example 5 or another example herein, wherein the functional mode or command state comprises at least one of idle, maintain location or position relative to a carrier, maintain location or position relative to a one or more other drones, maintain location or position relative to a target location, maintain location or position relative to a location on the ground, move to a location, move between a first location and a second location, hold position, obstacle avoidance, package drop, or direct control.

Example 10. The control system according to Example 1 or another example herein, wherein position comprises at least one of a coordinate in an x-axis, a y-axis, and a z-axis and wherein motion comprises at least one of rotation, pendular motion, or movement from a first position to a second position.

Example 11. The control system according to Example 1 or another example herein, wherein the drone thruster comprises one of a fan, compressed air, a rocket, or a gyroscope.

Example 12. The control system according to Example 1 or another example herein, wherein to control the drone thruster comprises to compensate for an angle or relative motion between the drone and the load to deliver the load to a target.

Example 13. The control system according to Example 12 or another example herein, wherein to compensate for the angle or relative motion between the drone and the load comprises to move the drone to a position which compensates for the angle or relative motion between the drone and the load.

Example 14. The control system according to Example 1 or another example herein, wherein the sensor suite is a first sensor suite and further comprising a second sensor suite, wherein the first sensor suite is in the drone and the second sensor suite is proximate to the load and a load thruster.

Example 15. The control system according to Example 1 or another example herein, wherein the sensor data comprises at least one of image data, accelerometer data, gyroscope data, magnetometer data, light detection and ranging ("LIDAR") data, and global positioning system ("GPS") data.

Example 16. A computer implemented method to influence at least one of a position, orientation, or motion of a drone-load system, comprising: a drone-load system comprising a drone, a load, and a computer processor and memory, wherein the drone comprises a drone thruster and wherein the memory comprises instructions for a control module; executing by the computer processor the instructions for the control module and thereby obtaining a sensor data from a sensor suite; determining at least one of a position, orientation, or motion of the drone-load system based on the sensor data from the sensor suite; and controlling the drone thruster to influence at least one of the position, orientation, or motion of the drone-load system.

Example 17. The method according to Example 16 or another example herein, wherein the load is secured to the drone by a suspension cable and further comprising a load thruster secured proximate to the load at a terminal end of the suspension cable and further executing by the processor the instructions for the control module and thereby controlling the drone thruster and the load thruster to influence at least one of the position, orientation, or motion of the drone-load system.

Example 18. The method according to Example 16 or another example herein, wherein the load is secured to the drone by a suspension cable and further comprising a hoist for the suspension cable and further executing by the processor the instructions for the control module and thereby controlling the hoist to influence at least one of the position, orientation, or motion of the drone-load system.

Example 19. The method according to Example 16 or another example herein, wherein determining at least one of the position, orientation, or motion of the drone-load system based on a sensor data from the sensor suite comprises estimating or predicting a state or parameter of the drone-load system based on the sensor data.

Example 20. The method according to Example 19 or another example herein, wherein estimating or predicting the state or parameter of the drone-load system based on the sensor data comprises combining the sensor data from the sensor suite in a non-linear filter according to a system model with feedback from at least one of a functional mode or command state of the control module, a thrust and orientation mapping, or a fan and hoist mapping.

Example 21. The method according to Example 20 or another example herein, wherein the system model comprises a mass of the drone, a mass of the load, a length between the drone and the load, an inertia of the load, an inertia of the drone, a center of mass of the drone-load system, an impulse force of the load thruster, an impulse force of the drone thruster, a rotational motion of the load, a rotational motion of the drone, a pendular motion of the load, a pendular motion of the drone, a movement of the load over time through an absolute coordinate space, and a movement of the drone over time through the absolute coordinate space.

Example 22. The method according to Example 19 or another example herein, further executing by the processor the instructions for the control module and thereby determining that a flight control parameter of the drone-load system is not exceeded by the state or parameter of the drone-load system.

Example 23. The method according to Example 22 or another example herein, wherein the flight control parameter of the drone-load system comprises at least one of a center of mass of the drone-load system relative to a maneuvering requirement or a mass of the drone-load system relative to an impulse force and battery capacity of the drone thruster.

Example 24. The method according to Example 20 or another example herein, wherein the functional mode or command state comprises at least one of idle, maintain location or position relative to a carrier, maintain location or position relative to a one or more other drones, maintain location or position relative to a target location, maintain location or position relative to a location on the ground, move to a location, move between a first location and a second location, hold position, obstacle avoidance, package drop, or direct control.

Example 25. The method according to Example 16 or another example herein, wherein position comprises at least one of a coordinate in an x-axis, a y-axis, and a z-axis and wherein motion comprises at least one of rotation, pendular motion, or movement from a first position to a second position.

Example 26. The method according to Example 16 or another example herein, wherein the drone thruster comprises one of a fan, compressed air, a rocket, or a gyroscope.

Example 27. The method according to Example 16 or another example herein, wherein controlling the drone thruster comprises compensating for an angle or relative motion between the drone and the load to deliver the load to a target.

Example 28. The method according to Example 27 or another example herein, wherein compensating for the angle or relative motion between the drone and the load comprises moving the drone to a position which compensates for the angle or relative motion between the drone and the load.

Example 29. The method according to Example 16 or another example herein, wherein the sensor suite is a first sensor suite and further comprising a second sensor suite, wherein the first sensor suite is in the drone and the second sensor suite is proximate to the load and a load thruster.

Example 30. The method according to Example 16 or another example herein, wherein the sensor data comprises at least one of image data, accelerometer data, gyroscope data, magnetometer data, light detection and ranging ("LIDAR") data, and global positioning system ("GPS") data.

Example 31. An apparatus to influence at least one of a position, orientation, or motion of a drone-load system, comprising: means for a drone-load system, wherein the drone-load system comprises a drone and a load, wherein the drone comprises means for a drone thruster; means to obtain a sensor data from a sensor suite, determine at least one of a position, orientation, or motion of the drone-load system based on the sensor data from the sensor suite, and control the drone thruster to influence at least one of the position, orientation, or motion of the drone-load system.

Example 32. The apparatus according to Example 31 or another example herein, further comprising means to secure the load to the drone by a suspension cable and further comprising means for a load thruster to be secured proximate to the load at a terminal end of the suspension cable and further comprising means to control the drone thruster and the load thruster to influence at least one of the position, orientation, or motion of the drone-load system.

Example 33. The apparatus according to Example 31 or another example herein, further comprising means to secure the load to the drone with a suspension cable and further comprising means for a hoist for the suspension cable and further comprising means to control the hoist to influence at least one of the position, orientation, or motion of the drone-load system.

Example 34. The apparatus according to Example 31 or another example herein, wherein means to determine at least one of the position, orientation, or motion of the drone-load system based on a sensor data from the sensor suite comprises means to estimate or predict a state or parameter of the drone-load system based on the sensor data.

Example 35. The apparatus according to Example 34 or another example herein, wherein means to estimate or predict the state or parameter of the drone-load system based on the sensor data comprises means to combine the sensor data from the sensor suite in a non-linear filter according to a system model with feedback from at least one of a functional mode or command state of the control module, a thrust and orientation mapping, or a fan and hoist mapping.

Example 36. The apparatus according to Example 35 or another example herein, wherein the system model comprises a mass of the drone, a mass of the load, a length between the drone and the load, an inertia of the load, an inertia of the drone, a center of mass of the drone-load system, an impulse force of the load thruster, an impulse force of the drone thruster, a rotational motion of the load, a rotational motion of the drone, a pendular motion of the load, a pendular motion of the drone, a movement of the load over time through an absolute coordinate space, and a movement of the drone over time through the absolute coordinate space.

Example 37. The apparatus according to Example 34 or another example herein, further comprising means to determine that a flight control parameter of the drone-load system is not exceeded by the state or parameter of the drone-load system.

Example 38. The apparatus according to Example 37 or another example herein, wherein the flight control parameter of the drone-load system comprises at least one of a center of mass of the drone-load system relative to a maneuvering requirement or a mass of the drone-load system relative to an impulse force and battery capacity of the drone thruster.

Example 39. The apparatus according to Example 35 or another example herein, wherein the functional mode or command state comprises at least one of idle, maintain location or position relative to a carrier, maintain location or position relative to a one or more other drones, maintain location or position relative to a target location, maintain location or position relative to a location on the ground, move to a location, move between a first location and a second location, hold position, obstacle avoidance, package drop, or direct control.

Example 40. The apparatus according to Example 31 or another example herein, wherein position comprises at least one of a coordinate in an x-axis, a y-axis, and a z-axis and wherein motion comprises at least one of rotation, pendular motion, or movement from a first position to a second position.

Example 41. The apparatus according to Example 31 or another example herein, wherein the drone thruster comprises means for at least one of a fan, compressed air, a rocket, or a gyroscope.

Example 42. The apparatus according to Example 31 or another example herein, wherein means to control the drone thruster comprises means to compensate for an angle or relative motion between the drone and the load to deliver the load to a target.

Example 43. The apparatus according to Example 42 or another example herein, wherein means to compensate for the angle or relative motion between the drone and the load comprises means to move the drone to a position which compensates for the angle or relative motion between the drone and the load.

Example 44. The apparatus according to Example 31 or another example herein, wherein the sensor suite is a first sensor suite and further comprising means for a second sensor suite, wherein the first sensor suite is in the drone and the second sensor suite is proximate to the load and a load thruster.

Example 45. The apparatus according to Example 31 or another example herein, wherein the sensor data comprises at least one of image data, accelerometer data, gyroscope data, magnetometer data, light detection and ranging ("LIDAR") data, and global positioning system ("GPS") data.

Example 46. One or more computer-readable media comprising instructions that cause a computer device, in response to execution of the instructions by a processor of the computer device, to: obtain a sensor data from a sensor suite, determine at least one of a position, orientation, or motion of a drone-load system based on the sensor data from the sensor suite, and control a drone thruster to influence at least one of the position, orientation, or motion of the drone-load system, wherein the drone-load system comprises a drone and a load and wherein the drone comprises the drone thruster.

Example 47. The computer-readable media according to Example 46 or another example herein, wherein the load is secured to the drone by a suspension cable and further comprising a load thruster secured proximate to the load at a terminal end of the suspension cable and where the instructions further cause the computer device to control the drone thruster and the load thruster to influence at least one of the position, orientation, or motion of the drone-load system.

Example 48. The computer-readable media according to Example 46, wherein the load is secured to the drone with a suspension cable, further comprising a hoist for the suspension cable, and where the instructions further cause the computer device to control the hoist to influence at least one of the position, orientation, or motion of the drone-load system.

Example 49. The computer-readable media according to Example 46 or another example herein, wherein to determine at least one of the position, orientation, or motion of the drone-load system based on a sensor data from the sensor suite comprises to estimate or predict a state or parameter of the drone-load system based on the sensor data.

Example 50. The computer-readable media according to Example 49 or another example herein, wherein to estimate or predict the state or parameter of the drone-load system based on the sensor data comprises to combine the sensor data from the sensor suite in a non-linear filter according to a system model with feedback from at least one of a functional mode or command state of the control module, a thrust and orientation mapping, or a fan and hoist mapping.

Example 51. The computer-readable media according to Example 50 or another example herein, wherein the system model comprises a mass of the drone, a mass of the load, a length between the drone and the load, an inertia of the load, an inertia of the drone, a center of mass of the drone-load system, an impulse force of the load thruster, an impulse force of the drone thruster, a rotational motion of the load, a rotational motion of the drone, a pendular motion of the load, a pendular motion of the drone, a movement of the load over time through an absolute coordinate space, and a movement of the drone over time through the absolute coordinate space.

Example 52. The computer-readable media according to Example 49 or another example herein, where the instructions further cause the computer device to determine that a flight control parameter of the drone-load system is not exceeded by the state or parameter of the drone-load system.

Example 53. The computer-readable media according to Example 52 or another example herein, wherein the flight control parameter of the drone-load system comprises at least one of a center of mass of the drone-load system relative to a maneuvering requirement or a mass of the drone-load system relative to an impulse force and battery capacity of the drone thruster.

Example 54. The computer-readable media according to Example 50 or another example herein, wherein the functional mode or command state comprises at least one of idle, maintain location or position relative to a carrier, maintain location or position relative to a one or more other drones, maintain location or position relative to a target location, maintain location or position relative to a location on the ground, move to a location, move between a first location and a second location, hold position, obstacle avoidance, package drop, or direct control.

Example 55. The computer-readable media according to Example 46 or another example herein, wherein position comprises at least one of a coordinate in an x-axis, a y-axis, and a z-axis and wherein motion comprises at least one of rotation, pendular motion, or movement from a first position to a second position.

Example 56. The computer-readable media according to Example 46 or another example herein, wherein the drone thruster comprises at least one of a fan, compressed air, a rocket, or a gyroscope.

Example 57. The computer-readable media according to Example 46 or another example herein, wherein to control the drone thruster comprises to compensate for an angle or relative motion between the drone and the load to deliver the load to a target.

Example 58. The computer-readable media according to Example 57 or another example herein, wherein to compensate for the angle or relative motion between the drone and the load comprises to move the drone to a position which compensates for the angle or relative motion between the drone and the load.

Example 59. The computer-readable media according to Example 46 or another example herein, wherein the sensor suite is a first sensor suite and further comprising a second sensor suite, wherein the first sensor suite is in the drone and the second sensor suite is proximate to the load and a load thruster.

Example 60. The computer-readable media according to Example 46 or another example herein, wherein the sensor data comprises at least one of image data, accelerometer data, gyroscope data, magnetometer data, light detection and ranging ("LIDAR") data, and global positioning system ("GPS") data.

The invention claimed is:

1. A system, comprising:
   a drone, a container, and a container thruster;
      wherein the drone comprises a drone thruster,
      wherein the container comprises the container thruster;
      wherein the container is to house a load; and wherein the container is operatively coupled to the drone;

a sensor suite, and a computer processor and memory;

wherein the memory comprises a control module which, when executed by the computer processor, is to determine at least one of a position, orientation, or motion of the container based on sensor data from the sensor suite and is to control the container thruster to influence at least one of the position, orientation, or motion of the container wherein to determine at least one of the position, orientation, or motion of the container based on sensor data from the sensor suite, comprises to estimate or predict a state or parameter of the container based on the sensor data; and further wherein to estimate or predict the state or parameter of the container based on the sensor data comprises to combine the sensor data from the sensor suite in a non-linear filter according to a system model.

2. The system according to claim 1, wherein the container thruster has a horizontal orientation and is to produce a horizontal thrust vector.

3. The system according to claim 1, wherein the load is to be transported to and deposited at a location by the system.

4. The system according to claim 1, wherein the container is operatively coupled to the drone by a suspension cable.

5. The system according to claim 4, further comprising a hoist for the suspension cable and wherein the control module is to control the hoist to influence at least one of the position, orientation, or motion of the container.

6. The system according to claim 1 wherein the system model comprises at least one of a mass of the drone, a mass of the container, a length between the drone and the container, an inertia of the container, an inertia of the drone, a center of mass of a drone-container system, an impulse force of the container thruster, an impulse force of the drone thruster, a rotational motion of the container, a rotational motion of the drone, a pendular motion of the container, a pendular motion of the drone, a movement of the container over time through an absolute coordinate space, and a movement of the drone over time through the absolute coordinate space.

7. The system according to claim 1, wherein the control module is to determine at least one of a position, orientation, or motion of the drone based on the sensor data from the sensor suite and is to control the drone thruster to influence at least one of the position, orientation, or motion of the drone.

8. The system according to claim 1, wherein the sensor suite comprises a first sensor suite and a second sensor suite;

wherein the sensor data comprises first sensor data and second sensor data;

wherein the first sensor suite is to obtain the first sensor data relative to the container;

wherein the second sensor suite is to obtain the second sensor data relative to the drone; and wherein the control module is to determine at least one of the position, orientation, or motion of the container based on the first sensor data and is to control the container thruster to influence at least one of the position, orientation, or motion of the container; and wherein the control module is to determine at least one of a position, orientation, or motion of the drone based on the second sensor data from the second sensor suite and is to control the drone thruster to influence at least one of the position, orientation, or motion of the drone.

9. The system according to claim 1, wherein the control module comprises a first control module and a second control module;

the sensor suite comprises a first sensor suite and a second sensor suite;

the sensor data comprises first sensor data and second sensor data;

the first sensor suite is to obtain the first sensor data relative to the container;

the second sensor suite is to obtain the second sensor data relative to the drone; and the first control module is to determine at least one of the position, orientation, or motion of the container based on the first sensor data and is to control the container thruster to influence at least one of the position, orientation, or motion of the container; and wherein the second control module is to determine at least one of a position, orientation, or motion of the drone based on the second sensor data from the second sensor suite and is to control the drone thruster to influence at least one of the position, orientation, or motion of the drone.

10. The system according to claim 9, wherein the computer processor and memory comprises a first computer processor and first memory in the container and a second computer processor and second memory in the drone;

wherein the first memory comprises the first control module and wherein the second memory comprises the second control module; and wherein the first processor is to execute the first control module and wherein the second processor is to execute the second control module.

11. The system according to claim 1, wherein to combine the sensor data from the sensor suite in the non-linear filter according to the system model further comprises to combine the sensor data from the sensor suite in the non-linear filter according to the system model with feedback from at least one of a functional mode or command state of the control module, a thrust and orientation mapping, or a fan and hoist mapping.

12. A computer implemented method, comprising:

with a drone, a container, and a container thruster;

wherein the drone comprises a drone thruster;

wherein the container is operatively coupled to the drone;

wherein the container comprises the container thruster; and wherein the container is to house a load;

with at least one computer processor and at least one control module in at least one computer memory, obtaining sensor data from a sensor suite;

determining at least one of a position, orientation, or motion of the container based on the sensor data from the sensor suite; and controlling the container thruster to influence at least one of the position, orientation, or motion of the container;

wherein determining at least one of the position, orientation, or motion of the container based on the sensor data from the sensor suite comprises estimating or predicting a state or parameter of the container based on the sensor data; and further wherein estimating or predicting the state or parameter of the container based on the sensor data comprises comgining the sensor data from the sensor suite in a non-linear filter according to a system model.

13. The method according to claim 12, wherein the container thruster has a horizontal orientation and further comprising controlling the container thruster to produce a horizontal thrust vector to influence at least one of the position, orientation, or motion of the container.

14. The method according to claim 12, wherein the container is operatively coupled to the drone by a suspension cable and further comprising controlling a hoist of the suspension cable to further influence at least one of the position, orientation, or motion of the container.

15. The method according to claim 12,
wherein the sensor suite comprises a first sensor suite and a second sensor suite;
wherein the sensor data comprises first sensor data and second sensor data;
obtaining the first sensor data relative to the container from the first sensor suite, determining at least one of the position, orientation, or motion of the container based on the first sensor data, and controlling the container thruster to influence at least one of the position, orientation, or motion of the container; and
obtaining the second sensor data relative to the drone from the second sensor suite, determining at least one of a position, orientation, or motion of the drone based on the second sensor data, and controlling the drone thruster to influence at least one of the position, orientation, or motion of the drone.

16. The apparatus according to claim 15, wherein the container thruster is horizontally oriented and comprises means to produce a horizontally oriented thrust vector.

17. The apparatus according to claim 15, wherein
the means for the sensor suite comprises means for a first sensor suite and means for a second sensor suite;
wherein the means for the first sensor suite are to obtain first sensor data relative to the container and wherein the means for the second sensor suite are to obtain second sensor data relative to the drone; and further comprising
means to obtain the first sensor data relative to the container, means to determine at least one of the position, orientation, or motion of the container based on the first sensor data, and means to control the container thruster to influence at least one of the position, orientation, or motion of the container; and
means to obtain the second sensor data relative to the drone, means to determine at least one of a position, orientation, or motion of the drone based on the second sensor data, and means to control the drone thruster to influence at least one of the position, orientation, or motion of the drone.

18. The apparatus according to claim 15, wherein the container is operatively coupled to the drone by a suspension cable and further comprising means to control a hoist of the suspension cable to influence at least one of the position, orientation, or motion of the container.

19. The method according to claim 12, wherein combining the sensor data from the sensor suite in the non-linear filter according to a system model further comprises combining the sensor data from the sensor suite in the non-linear filter according to the system model with feedback from at least one of a functional mode or command state of the control module, a thrust and orientation mapping, or a fan and hoist mapping.

20. An apparatus, comprising:
means for a drone, wherein the drone comprises means for a drone thruster;
means for a container, wherein the container is operatively coupled to the drone and wherein the container comprises means to house a load;
means for a container thruster;
means for a sensor suite;
wherein the apparatus further comprises means for at least one control module in at least one computer memory, wherein, when performed by at least one computer processor, the at least one control module comprises means to obtain sensor data from the sensor suite, means to determine at least one of a position, orientation, or motion of the container based on the sensor data from the sensor suite, and means to control the container thruster to influence at least one of the position, orientation, or motion of at least the load;
wherein means to determine at least one of the position, orientation, or motion of the container based on the sensor data from the sensor suite comprises means to estimate or predict a state or parameter of the container based on the sensor data; and further
wherein means to estimate or predict the state or parameter of the container based on the sensor data comprises means to combine the sensor data from the sensor suite in a non-linear filter according to a system model.

21. The apparatus according to claim 20, wherein means to combine the sensor data from the sensor suite in the non-linear filter according to a system model further comprises means to combine the sensor data from the sensor suite in a non-linear filter according to a system model with feedback from at least one of a functional mode or command state of the control module, a thrust and orientation mapping, or a fan and hoist mapping.

* * * * *